(12) United States Patent
Vantalon et al.

(10) Patent No.: US 7,216,358 B1
(45) Date of Patent: May 8, 2007

(54) DIGITAL TELEVISION CONDITIONAL ACCESS METHODS AND APPARATUS WITH MULTIPLE DATA TRANSPORT MECHANISM

(75) Inventors: Luc Vantalon, Sunnyvale, CA (US); Arnaud Chataignier, Ceyreste (FR); Christophe Genevois, La Ciotat (FR)

(73) Assignee: SmarDTV SA (CH)

( * ) Notice: Subject to any disclaimer, the term of this patent is extended or adjusted under 35 U.S.C. 154(b) by 0 days.

(21) Appl. No.: 09/444,488

(22) Filed: Nov. 19, 1999

(51) Int. Cl.
*H04N 7/16* (2006.01)
(52) U.S. Cl. .......................... 725/25; 370/389; 380/28
(58) Field of Classification Search ................ 725/31, 725/4, 8; 370/466, 472, 389, 392, 471; 348/469, 348/441; 380/28, 42, 43; 705/12, 54
See application file for complete search history.

(56) References Cited

U.S. PATENT DOCUMENTS

| | | | |
|---|---|---|---|
| 5,602,920 A | 2/1997 | Bestler et al. | |
| 5,852,290 A | 12/1998 | Chaney | |
| 5,874,985 A * | 2/1999 | Matthews, III | ............... 725/32 |
| 6,157,411 A * | 12/2000 | Williams et al. | ............ 348/552 |
| 6,735,310 B1 * | 5/2004 | Hsing et al. | .................. 380/28 |

FOREIGN PATENT DOCUMENTS

EP   0 880 277 A2   11/1998

OTHER PUBLICATIONS

"Functional Model of a Condition Access System", EBU Review Technical, (1995) Winter, No. 266, pp. 64-77.

* cited by examiner

*Primary Examiner*—Christopher S Kelley
*Assistant Examiner*—James Sheleheda
(74) *Attorney, Agent, or Firm*—Stuart J. Friedman

(57) ABSTRACT

Conditional access methods and apparatus are provided for use with digital television receivers and other digital broadband receivers. The methods and apparatus are capable of handling several different digital signal transmission protocols in an automatic and flexible manner. An input unit is provided for analyzing and tagging incoming data bytes so that further processing operations are less dependent on the transmission format being received. A cipher handling unit is provided for adapting in real time the scrambling and descrambling performances to match the requirements of the transmission network and the receiving apparatus. A filtering mechanism is provided for filtering and handling multiple asynchronous data streams in a parallel manner.

26 Claims, 21 Drawing Sheets

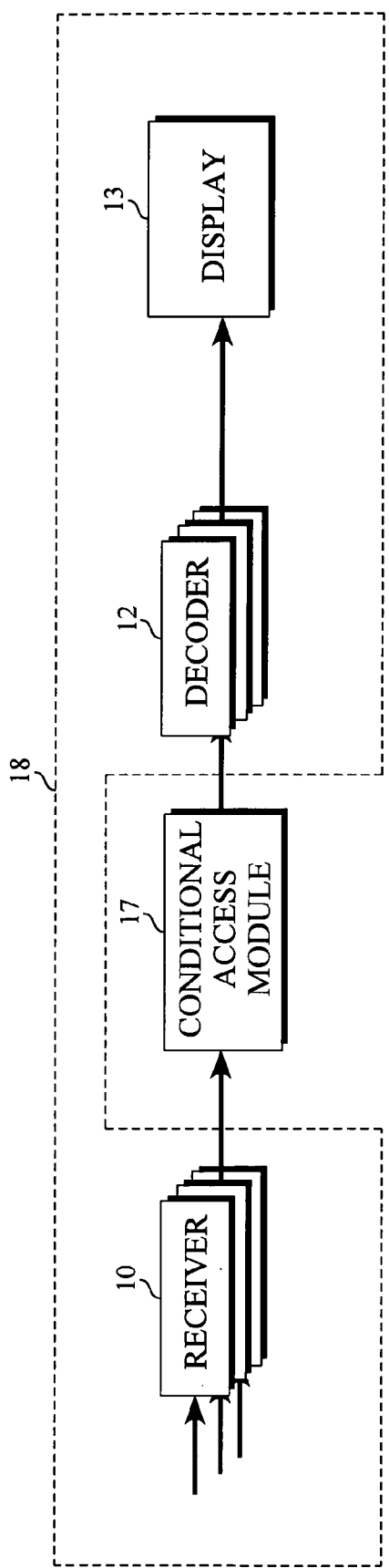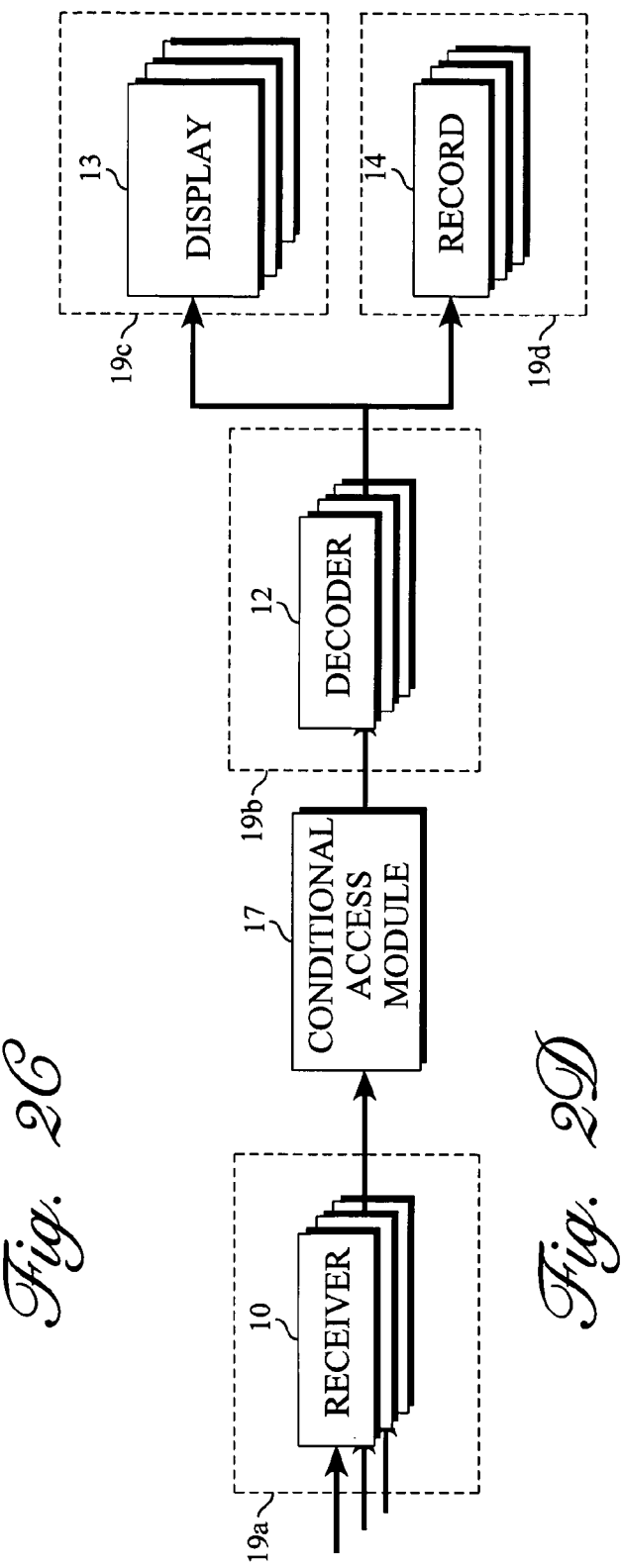
Fig. 2C
Fig. 2D

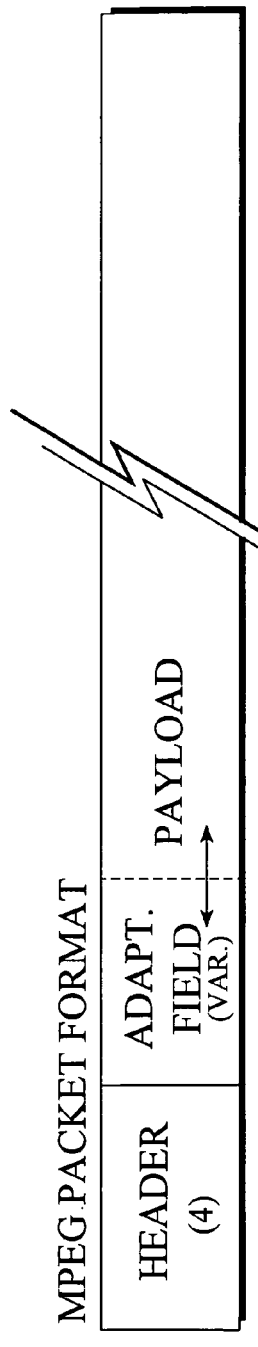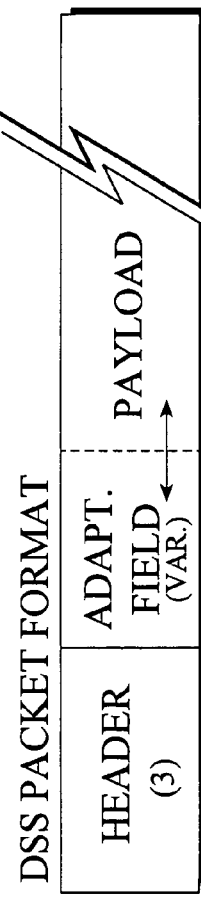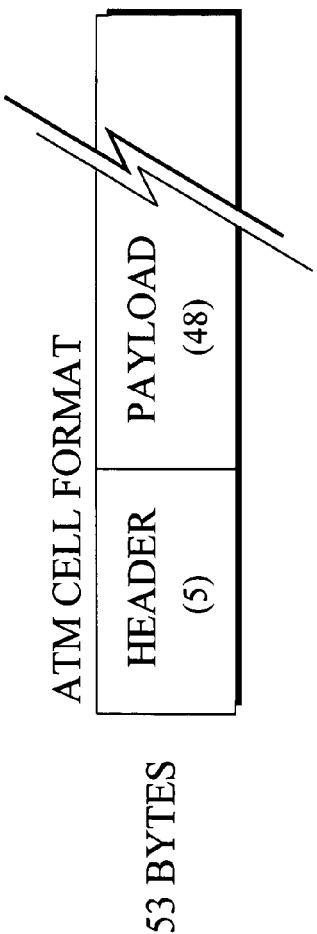

DIGITAL TELEVISION CONDITIONAL ACCESS METHODS AND APPARATUS WITH MULTIPLE DATA TRANSPORT MECHANISM

CROSS-REFERENCE TO RELATED APPLICATIONS

This application is related to the following copending patent applications: (1) Ser. No. 09/444,490, filed on even date herewith, entitled "Adaptive Trans-Scrambling Mechanism for Digital Television Multiple Data Transport System" and invented by Luc Vantalon, Arnaud Chataignier, and Christophe Genevois; (2) Ser. No. 09/444,495, filed on even date herewith, entitled "Digital Television Methods and Apparatus" and invented by Luc Vantalon, Arnaud Chataignier, and Christophe Genevois; and (3) Ser. No. 09/443,173, filed on even date herewith, entitled "Signal Filtering Mechanism for a Multi-Purpose Digital Television Receiver" and invented by Luc Vantalon, Arnaud Chataignier, and Christophe Genevois. The foregoing cross-referenced patent applications are expressly incorporated in their entirety into this application by this reference thereto.

TECHNICAL FIELD

This invention relates to digital television systems and services and particularly to conditional access methods and apparatus for use with such systems and services.

BACKGROUND OF THE INVENTION

Digital television is an emerging technology which is becoming increasingly popular with the public. One of the more interesting aspects is the introduction of so-called "high-definition television" (HDTV), the broadcasting of which was recently approved by the United States Federal Communications Commission. HDTV will provide television images of much higher quality and definition than is provided by preexisting "conventional definition" television systems.

Another highly important aspect of digital television is the providing of related services, such as video-on-demand programming, pay-per-view movies and sporting events, interactive video games, home shopping capabilities, high-speed Internet access and the like. The home television set is fast becoming the predominate information and services dispensing medium of the future.

As is known, television services are presently communicated by land-based radio-type broadcast transmissions, cable network transmissions and space satellite transmissions. In order to limit reception to paid subscribers, it is common practice for cable and satellite providers to scramble their transmissions and to require their customers to use a special set-top control box to unscramble the received signals. Such scrambling and set-top box techniques are also desired by providers of related services. The problem to date is that each provider has developed its own unique and proprietary set-top control box. Thus, to receive and use signals from multiple providers requires the use of multiple set-top control boxes. This is not the best situation and, in order to overcome the problem, the U.S. Federal Communications Commission is encouraging a so-called "open" receiver approach for providing a universal set-top box capable of receiving and handling content from multiple providers. Unfortunately, this is not an easy thing to do and at the same time provide the security control features needed to protect the various service providers from loss of services to unauthorized users.

SUMMARY OF THE INVENTION

The present invention provides an efficient and flexible security mechanism for use with a "universal" set-top control box. This security mechanism grants conditional access to the transmitted program material in a manner, which provides a high degree of protection against unauthorized use of the material. This conditional access mechanism includes a multi-transport capability, which performs descrambling and filtering operations on different transmission protocols by qualifying the different components of the transport layer using a unique coding technique.

The multiple transport apparatus of the present invention is capable of automatically handling several different data transport stream formats. It can, for example, handle MPEG, DSS and ATM type data transport streams. This is accomplished by qualifying each newly-received data byte according to its position and value within its packet. A plural-bit tag is assigned to each data byte, such tag having a value determined by the qualifying process. The qualified and tagged data byte provides all the information required for further processing of the data byte. The qualification mechanism is unique and is not dependent on the transport system used for carrying the received packet bytes. The qualification mechanism supports both broadcast and burst transmission modes and it provides all the information required for further processing.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIGS. 2A–2D show different ways of packaging the apparatus of FIG. 1;

FIGS. 19, 20 and 21 show the packet formats for different types of data transport streams that may be handled by the present invention;

DETAILED DESCRIPTION OF THE ILLUSTRATED EMBODIMENTS

Figure 1:
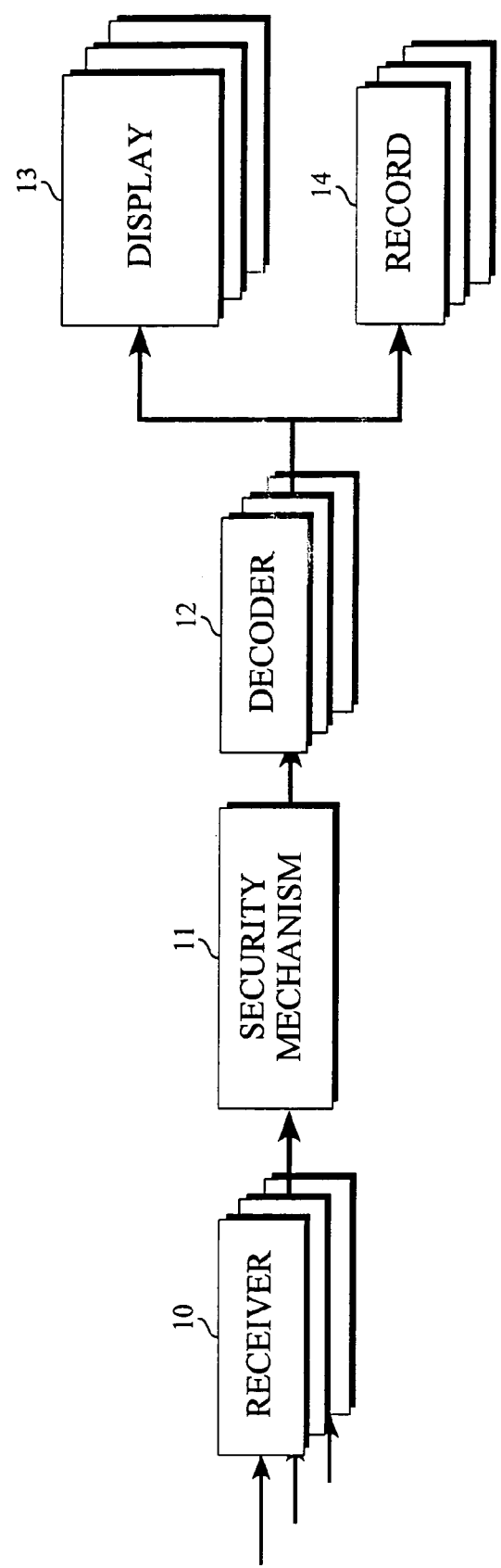
FIG. 1 is a general block diagram of a digital television receiving system with a security mechanism for preventing unauthorized display of the transmitted images.

Referring to FIG. 1, there is shown a general block diagram of a digital broadband receiving system having one or more receivers 10 connected to one or more broadband signal transmission networks. Typical signal transmission networks include land-based radio-frequency type broadcast networks, cable networks, space satellite signal transmission networks, broadband telephone networks, etc. The analog information signals intended for transmission (for example: video signals, audio signals, or data signals) are converted to specific digital transport stream formats for transmission purposes. Typical transport stream formats are the MPEG format, the DSS format and the ATM format. The MPEG format is the data transmission format developed by the Motion Picture Expert Group. A preferred form of MPEG is MPEG-2, which is defined in ISO/IEC Standard 13818. The acronym "DSS" stands for Digital Satellite Systems and refers to a format developed for use in transmitting digital signals used by some satellite operators. The acronym "ATM" stands for Asynchronous Transfer Mode. It is a digital signal protocol for efficient transport of both fixed rate and bursty information in broadband digital networks. The ATM digital stream consists of fixed length packets called "cells."

Each receiver 10 demodulates its received signal and supplies the demodulated signal to a security mechanism 11. Security mechanism 11 selects one or more of the received signal transport streams and removes the network distribution security layers therefrom, provided the end user is entitled to receive the signals. Network security mechanism 11 also applies content protection to any of the signal streams that require it. The resulting signals are supplied to decoders 12 which select one or more of the signal streams and decodes each selected stream to recreate the desired video, audio and data signals which are, in turn, supplied to one or more display units 13 and one or more recording units 14. Typical display units include television sets and television and computer monitors. Typical recording units include VCR-type video recorders and various types of computer memory units. Security mechanism 11 examines the received signal or signals and determines their types and controls their descrambling. Security mechanism 11 allows access to an unscrambled version of the received signal, provided the required conditions are met.

In addition to regular digital television programming, the receiving system of FIG. 1 also receives and handles various related communications services. Examples of related services are video-on-demand programming, pay-per-view movies and sporting events, interactive video games, home shopping services, high-speed Internet access, and the like. As will be seen, the data signals and control signals for these related services over a two-way cable system are supplied by way of a so-called "out-of-band" channel.

Figure 2A:
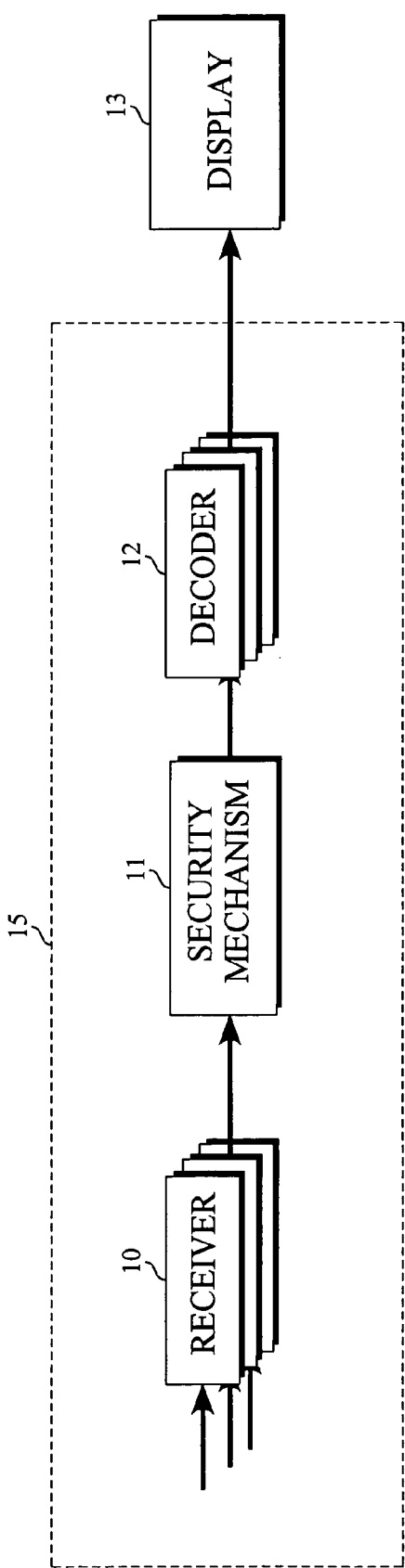

FIGS. 2A–2D show different ways of packaging the apparatus of FIG. 1. In particular, FIG. 2A shows the case where the receivers 10, security mechanism 11 and decoders 12 are located within a network specific set-top box 15. In one case, the security mechanism 11 is imbedded within or permanently mounted within the set-top box 15. In a typical use, the set-top box 15 sits on top of the display unit 13.

Figure 2B:
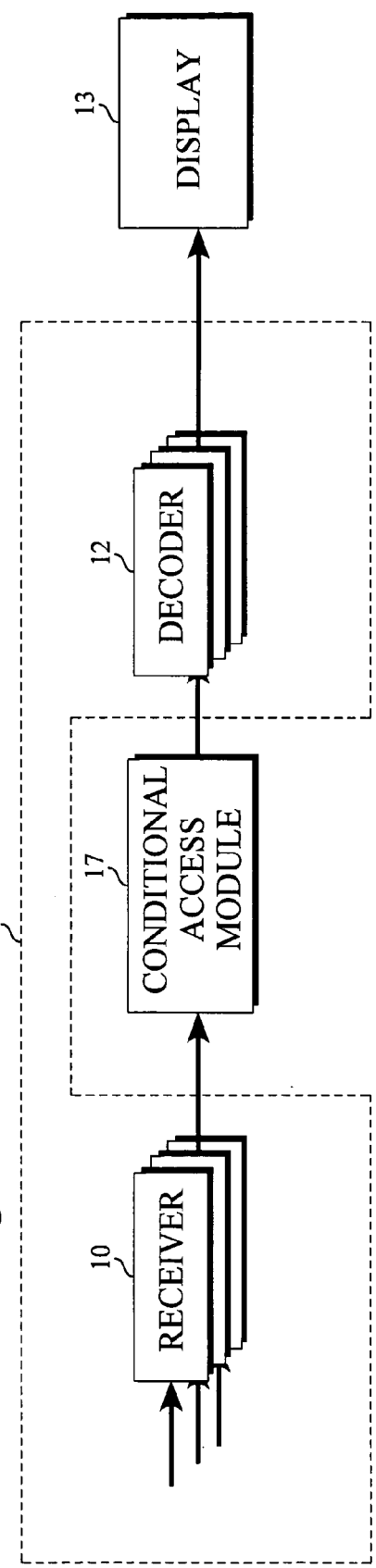

FIG. 2B shows an open-type set-top box 16 with a renewable and removable add-on security mechanism represented by a conditional access module (CAM) 17. Conditional access module 17 performs the security functions provided by the security mechanism 11 of FIG. 2A. Conditional access module 17 is a removable plug-in type element which is adapted to be plugged into a cooperating receptacle or socket in the host set-top box 16. As in FIG. 2A, set-top box 16 is designed to sit on top of the display unit 13.

FIG. 2C shows the case where the set-top box functions are located inside the cabinet 18 of a television receiver, that is, the cabinet which houses the display unit or picture tube 13. The conditional access module 17 is adapted to plug into a cooperative receptacle which is accessible from the outside of the cabinet 18. FIG. 2C represents an integrated television set with a renewable, add-on security mechanism represented by the conditional access module 17.

FIG. 2D represents the case where the primary units are located in separate component-type cabinets or boxes 19a–19d. The conditional access module 17 may be removably plugged into the receiver box 19a or the decoder box 19b or may, instead, be part of a small connector unit which is connected between boxes 19a and 19b. The configuration of FIG. 2D would be particularly useful in a component-type entertainment center intended for home use.

Figure 3:
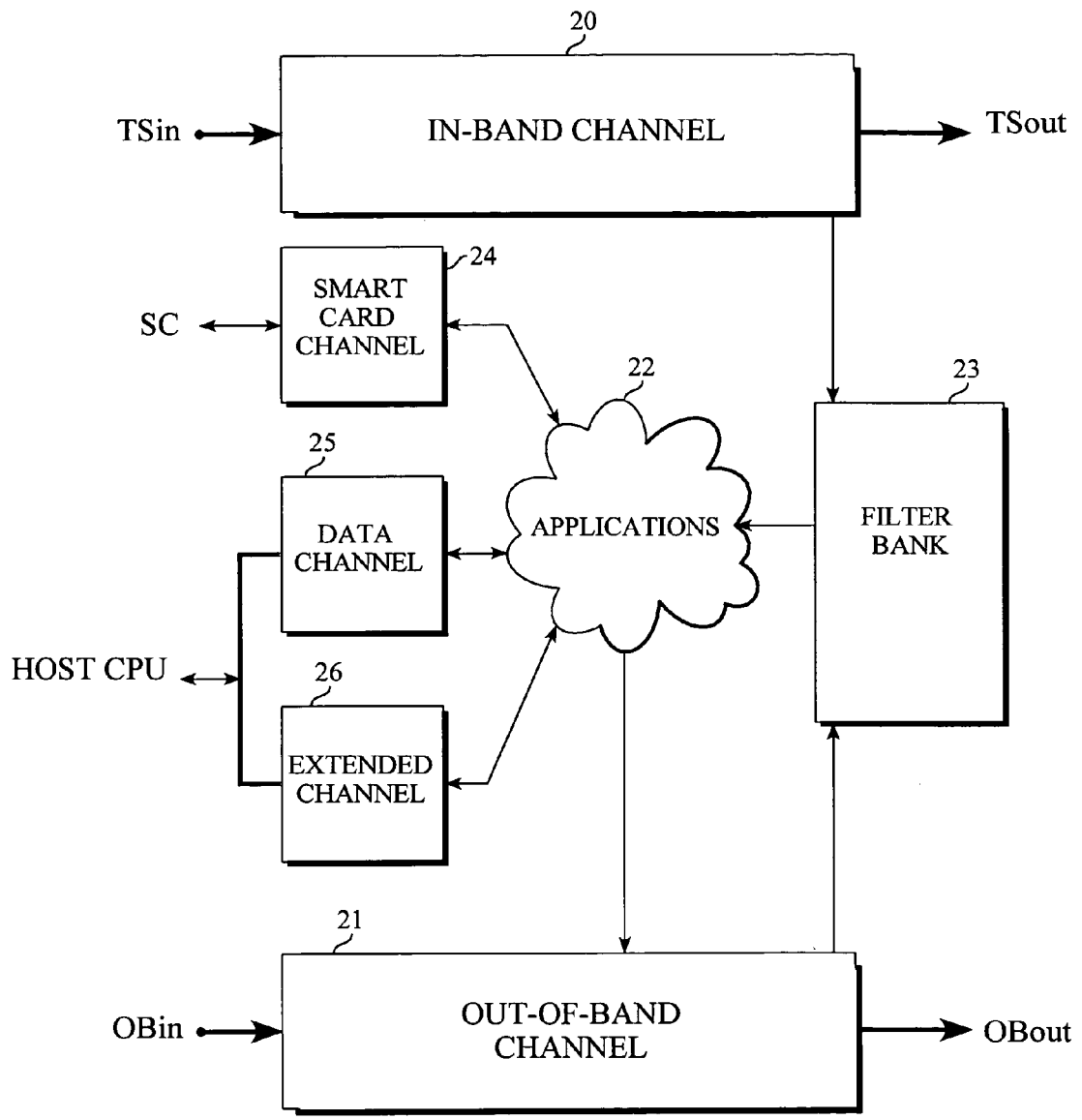
FIG. 3 is a conceptual diagram for one embodiment of the present invention.

Referring to FIG. 3, there is shown a conceptual diagram for one embodiment of the present invention. As there seen, the receiving apparatus includes an in-band channel 20 and an out-of-band channel 21, which are adapted to receive incoming signals from a cable system head-end. The in-band channel 20 handles the primary user signals, such as the digital television signals. The out-of-band channel 21 handles the digital control signals for the related services, such as video-on-demand commands, security data, e-commerce transactions, etc. Both of channels 20 and 21 communicate with various application programs 22 by way of a filter bank 23 which detects various defined digital patterns within the received signals and reacts thereto for establishing connections with the appropriate ones of applications 22.

The apparatus of FIG. 3 also includes a smart card channel 24 for providing communications between a smart card SC and the applications programs 22. A data channel 25 provides communications between a CPU (Central Processing Unit) located in the host unit, for example, set-top box (STB) 16, and the application programs 22. An extended channel 26 is provided to transfer network data over the out-of-band channel from the network to the host CPU or vice versa.

Figure 4:
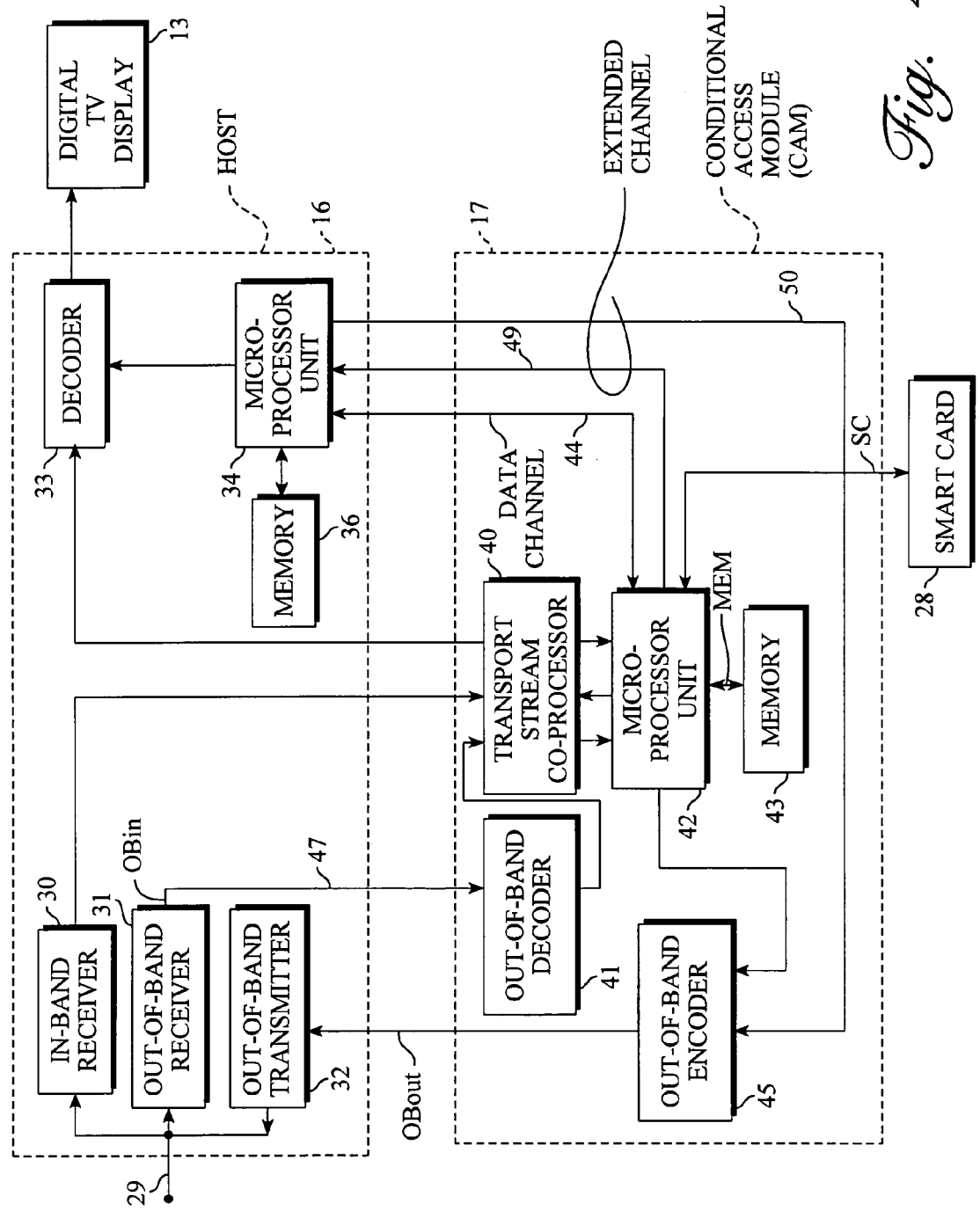
FIG. 4 shows in greater detail a representative form of internal construction for the set-top box and the conditional access module of FIG. 2B.

Referring to FIG. 4 there is shown in greater detail a representative form of internal instruction for the host unit or set-top box 16 and the conditional access module 17 of FIG. 2B. As seen in FIG. 4, a signal connector 29 connects the set-top box 16 to the communications network supplying the signals. This signal path 29 runs to an in-band receiver 30 and an out-of-band receiver 31. The communications network is a multi-channel system and the channel conveying the primary video and audio signals is labeled as the "in-band" channel and the channel which carries the control signals for the related services is called the "out-of-band" channel. The set-top box 16 further includes an out-of-band transmitter 32 for transmitting signals back to the digital data provider located at the network broadcasting center.

The digital signals appearing at the outputs of receivers 30 and 31 are supplied to the conditional access module 17. The primary video and audio signals are supplied back to a decoder 33 in the set-top box 16 and from there to the digital TV display 13. The set-top box 16 includes a microprocessor unit 34, which, among other things, provides control signals to the decoder 33. A memory unit 36 is coupled to the microprocessor unit 34 and, among other things, provides storage for various control routines and application program functions utilized by the microprocessor unit 34. Microprocessor unit 34 and memory 36 provide a CPU function for the set-top box 16.

The conditional access module (CAM) 17 of FIG. 4 includes a transport stream (TS) co-processor 40 which receives the output digital signals from the in-band receiver 30 and the out-of-band receiver 31, the latter being supplied by way of an out-of-band decoder 41. Transport stream co-processor 40 also supplies the digital video and digital audio signals, which are intended for the TV display 13, to the decoder 33. Conditional access module 17 further includes a microprocessor unit 42 and an associated memory unit 43. These units 42 and 43 provide a CPU function for the conditional access module 17. The primary portion of the application programs 22 are stored in the memory 43. A data channel 44 provides a direct communications link between the CAM microprocessor unit 42 and the host microprocessor unit 34. The CAM microprocessor unit 42 can also send digital messages and information back to the cable headend. This is done by way of an out-of-band encoder 45 and the out-of-band transmitter 32 in the host set-top box 16. A removable smart card 28 is adapted to be connected to the microprocessor unit 42 for supplying control information thereto.

An extended channel is provided for enabling the cable head-end to communicate with the host microprocessor unit 34 and vice-versa. The incoming branch of this extended channel includes a signal path 47 coupled to the out-of-band receiver 31 and extending to the out-of-band decoder 41. This incoming branch includes the decoder 41, transport stream co-processor 40, microprocessor 42 and a further signal path 49 which runs from the microprocessor 42 to the host microprocessor 34. The outgoing branch of this extended channel is provided by a signal path 50 which runs from the host microprocessor 34 directly to the out-of-band encoder 45.

Figure 5:
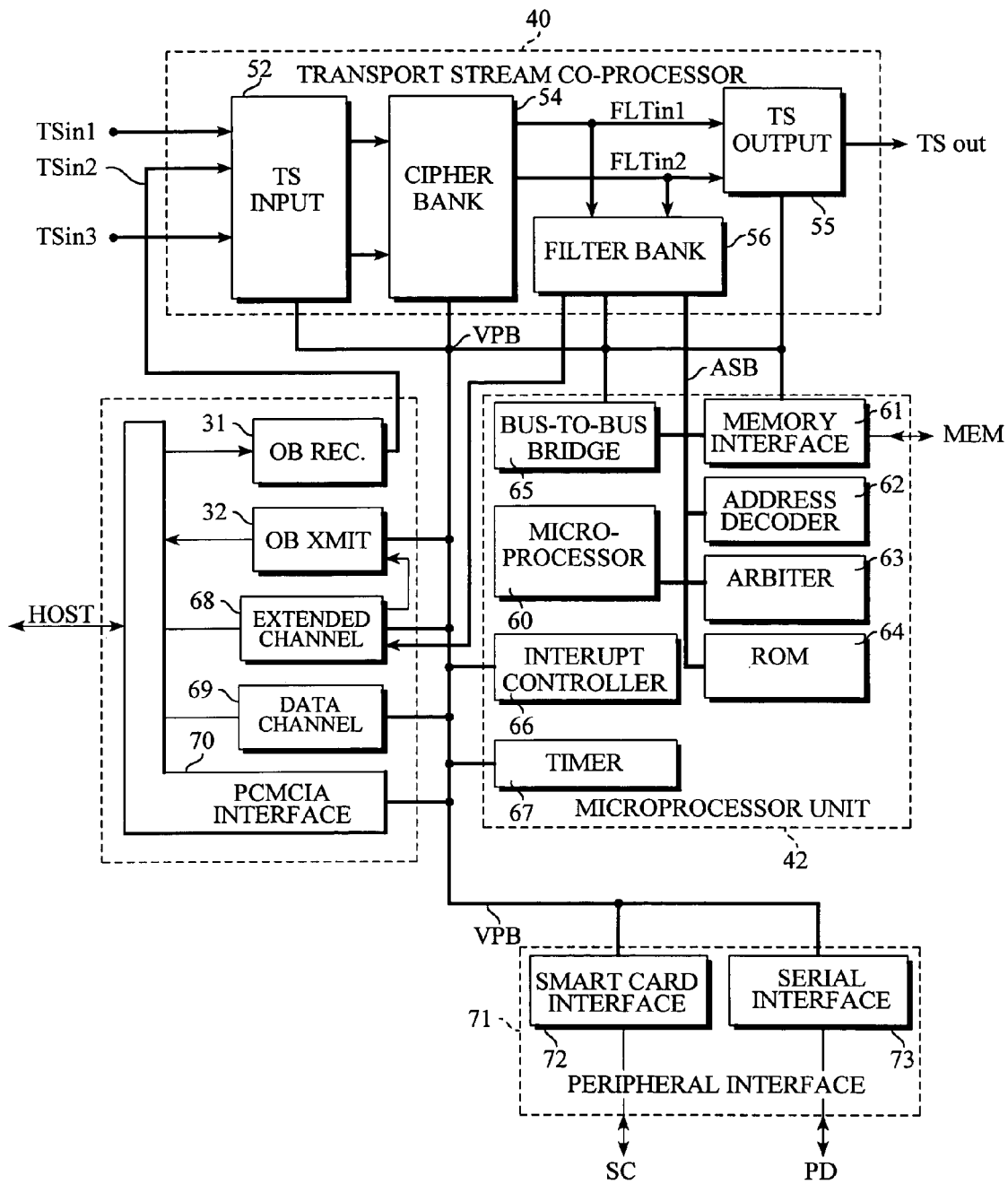
FIG. 5 is a detailed block diagram for the transport stream co-processor and the microprocessor unit of the conditional access module of FIG. 4.

Referring to FIG. 5, there is shown a detailed block diagram for the transport stream (TS) co-processor 40 and the microprocessor unit 42 of the conditional access module (CAM) 17 of FIG. 4. As seen in FIG. 5, the transport stream (TS) co-processor 40 includes a transport stream (TS) input unit 52 which receives parallel-type digital input signals TSin1 and TSin2 from the in-band receiver 30 and the out-of-band receiver 31, respectively. An additional serial-type digital signal input TSin3 is added for processing other signals. The output signals from the input unit 52 are supplied to a cipher bank 54 for further processing. Cipher bank 54 produces two parallel type output streams which are connected to the inputs of a TS output unit 55 and a filter bank 56. By multiplexer selection within the cipher bank 54, one of the two input streams to the cipher bank 54 is processed by an internal cipher processor, while the other input stream is simply bypassed to the TS output unit 55 and the filter bank 56. The TSout signal from TS output unit 55 is supplied to the decoder 33 in the set-top box 16.

The transport stream input unit 52 includes a multiple data transport mechanism capable of receiving a plurality of different transport stream formats. In particular, it includes a qualifying mechanism for receiving and qualifying incoming data bytes according to their positions and values in their plural-byte data packets. TS input unit 52 further includes a tagging mechanism for assigning a plural-bit tag to each data byte, such tag having a unique value determined by the results of the qualifying process. The tag bits are used to facilitate the further processing of the data bytes.

The microprocessor unit 42 includes a microprocessor 60 which is connected to a 32-bit system bus ASB which typically operates in a high speed transfer mode. Also connected to the ASB bus are a memory interface unit 61, an address decoder unit 62, an arbiter unit 63, and a read only memory (ROM) unit 64. Memory interface 61 is connected to the external memory 43 associated with the microprocessor unit 42.

The microprocessor 60 communicates with the transport stream coprocessor 40 and various other units by means of a peripheral bus VPB. This VPB bus is connected to the microprocessor 60 by way of a bus-to-bus bridge unit 65 and the high-speed ASB bus. The ASB bus is used for fast transfers and the VPB bus is used for communications with a lower priority. As the filter bank 56 of co-processor 40 needs a direct and fast access to the external memory 43 for its output data, it is also connected to the ASB bus. As a consequence, there are three masters on the ABS bus, namely, the microprocessor 60 and the two channels of the filter bank 56. The arbitration between these masters is managed by the arbiter unit 63. By way of comparison, the VPB bus has only a single master, namely, the microprocessor 60.

The address decoder 62 decodes the address bits on the ASB bus to select the right target for the data on the ASB bus. Typical targets are the memory interface 61, ROM 64 and the various peripherals and other units connected to the ASB bus. An interrupt controller 66 provides the interrupt function for the microprocessor 60, while a timer 67 provides various timing functions. Each of the units in the transport stream co-processor 40 is coupled to the lower priority VPB bus for control and status purposes. Also coupled to the VPB bus are an extended channel unit 68, a data channel unit 69 and a PCMCIA interface 70. A peripheral interface unit 71 provides an interface between the VPB bus and one or more peripheral devices. For example, a smart card interface connector structure 72 is provided for making connection with a removable smart card 28 shown in FIG. 4. A serial interface 73 may be provided for connecting to a serial type peripheral device PD.

Figure 6:
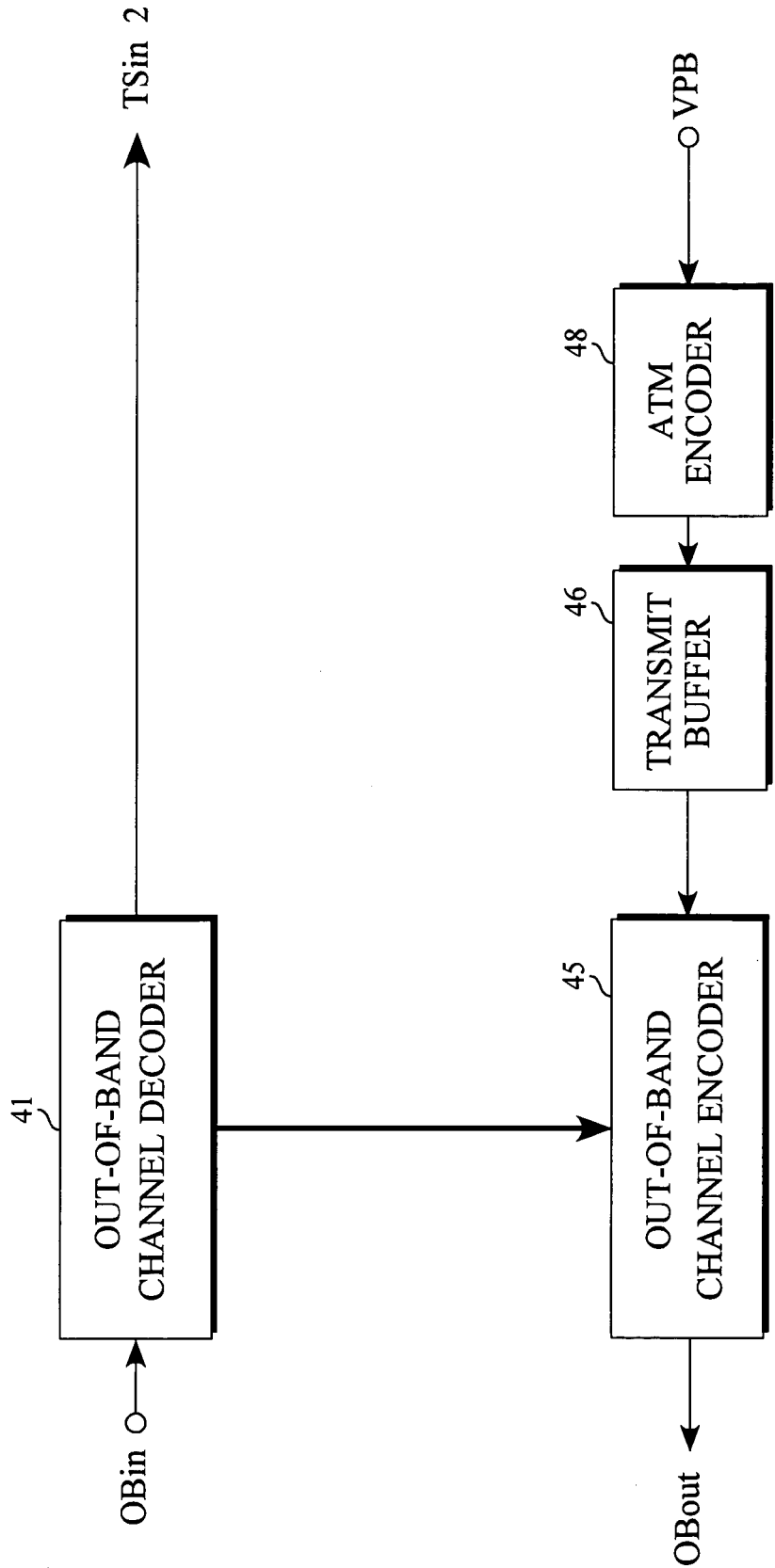
FIG. 6 shows a representative form of construction for an out-of-band channel feature of the present invention.

FIG. 6 shows a representative form of construction for an out-of-band channel feature of the present invention. This out-of-band channel feature includes an out-of-band channel decoder 41 which receives the out-of-band signal OBin from the out-of-band receiver 31 shown in FIG. 4. The output of decoder 41 is supplied by way of the transport stream co-processor 40 for further filtering operations. The outgoing or transmitter portion of the out-of-band channel includes ATM encoder 48, transmit buffer 46 and a channel encoder 45 which supplies the out-of-band output signal OBout to the out-of-band transmitter 32 shown in FIG. 4. The ATM encoder 48 receives its input signal from the VPB peripheral bus associated with the microprocessor unit 42. The data to be transmitted is supplied by either the application programs located in the microprocessor unit 42 or the data received from the set-top box 16 by way of the extended channel path 50. This data is segmented into ATM cells by the ATM encoder 48. These cells are temporarily stored in the buffer 46. When the network grants some transmission slots to the conditional access module 17, the transmit buffer 46 is emptied by channel encoder 45 and is transmitted by way of out-of-band transmitter 32 to the cable head-end.

Figure 7:
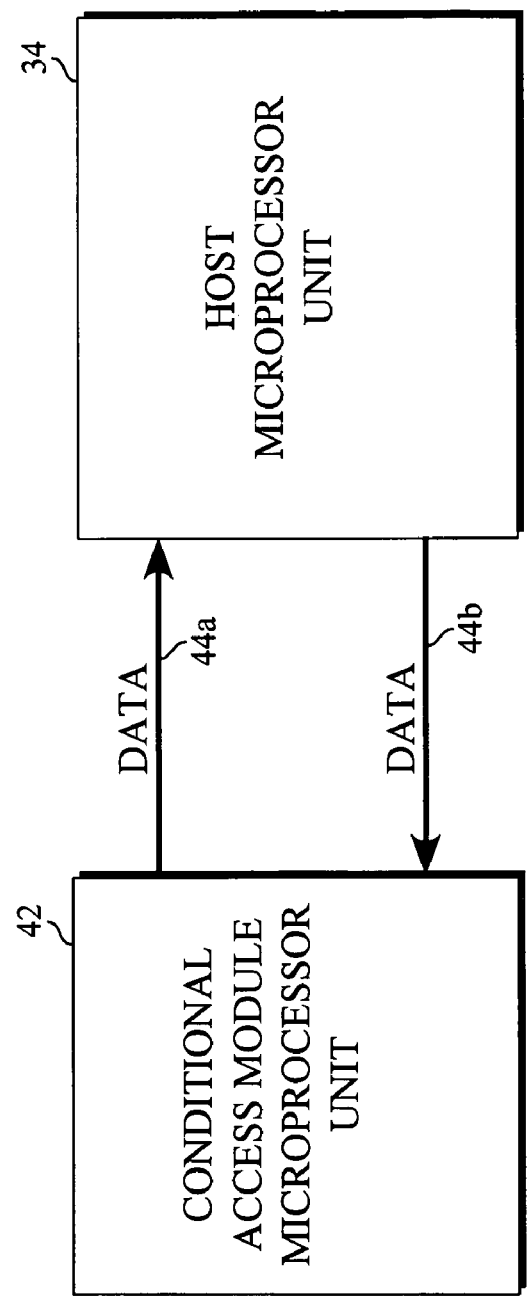
FIG. 7 shows a representative form of construction for a microprocessor-to-microprocessor data channel feature of the present invention.

FIG. 7 shows a microprocessor-to-microprocessor data channel feature of the present invention. This feature enables the CAM microprocessor unit 42 to communicate directly with the host microprocessor unit 34 and vice-versa. Microprocessor unit 42 sends data to the microprocessor unit 34 by way of data channel 44*a*. The host unit 34 sends data to the CAM microprocessor 42 by way of data channel 44*b*.

Figure 8:
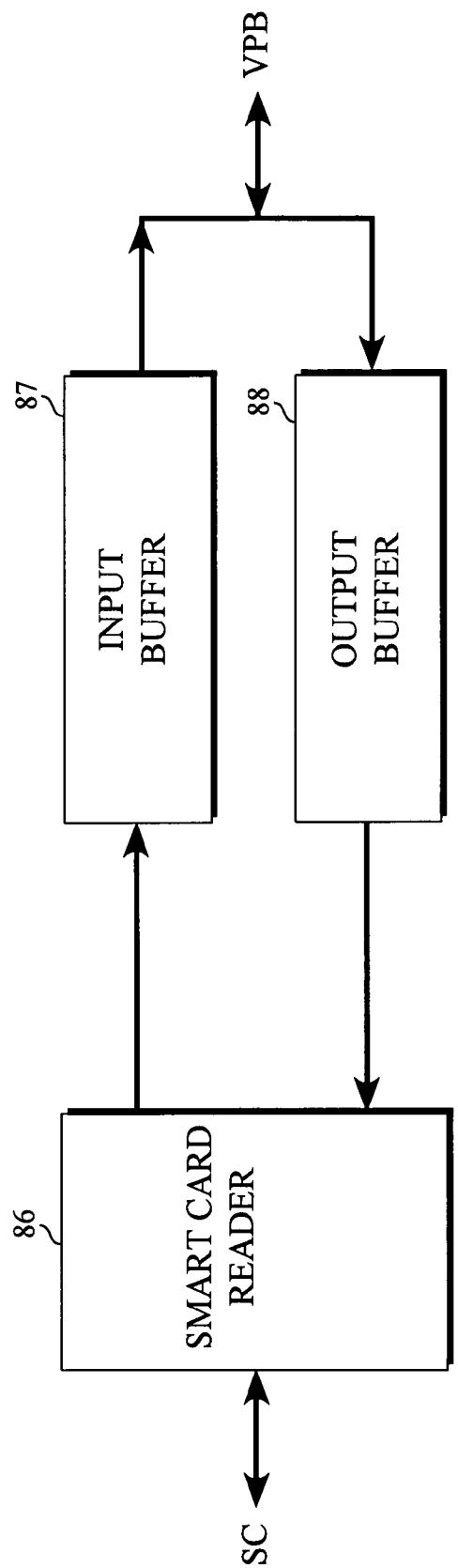
FIG. 8 shows a representative form of construction for a Smart Card channel feature of the present invention.

FIG. 8 shows the details of the smart card (SC) interface 72 of FIG. 5. The smart card 28 is adapted to be inserted into a smart card reader 86 and the data received from the smart card 28 is supplied by way of an input buffer 87 to the peripheral bus VPB associated with the microprocessor unit 42. Data from the microprocessor unit 42 is supplied by way of the VPB bus, output buffer 88 and the smart card reader 86 to the smart card 28. In a representative embodiment, smart card reader 86 is a PCMCIA card reader. The acronym PCMCIA stands for Personal Computer Memory Card International Association. This is a non-profit trade association founded in 1989 to define a standard memory card interface. The smart card reader 86 complies with this interface standard.

Figure 9:
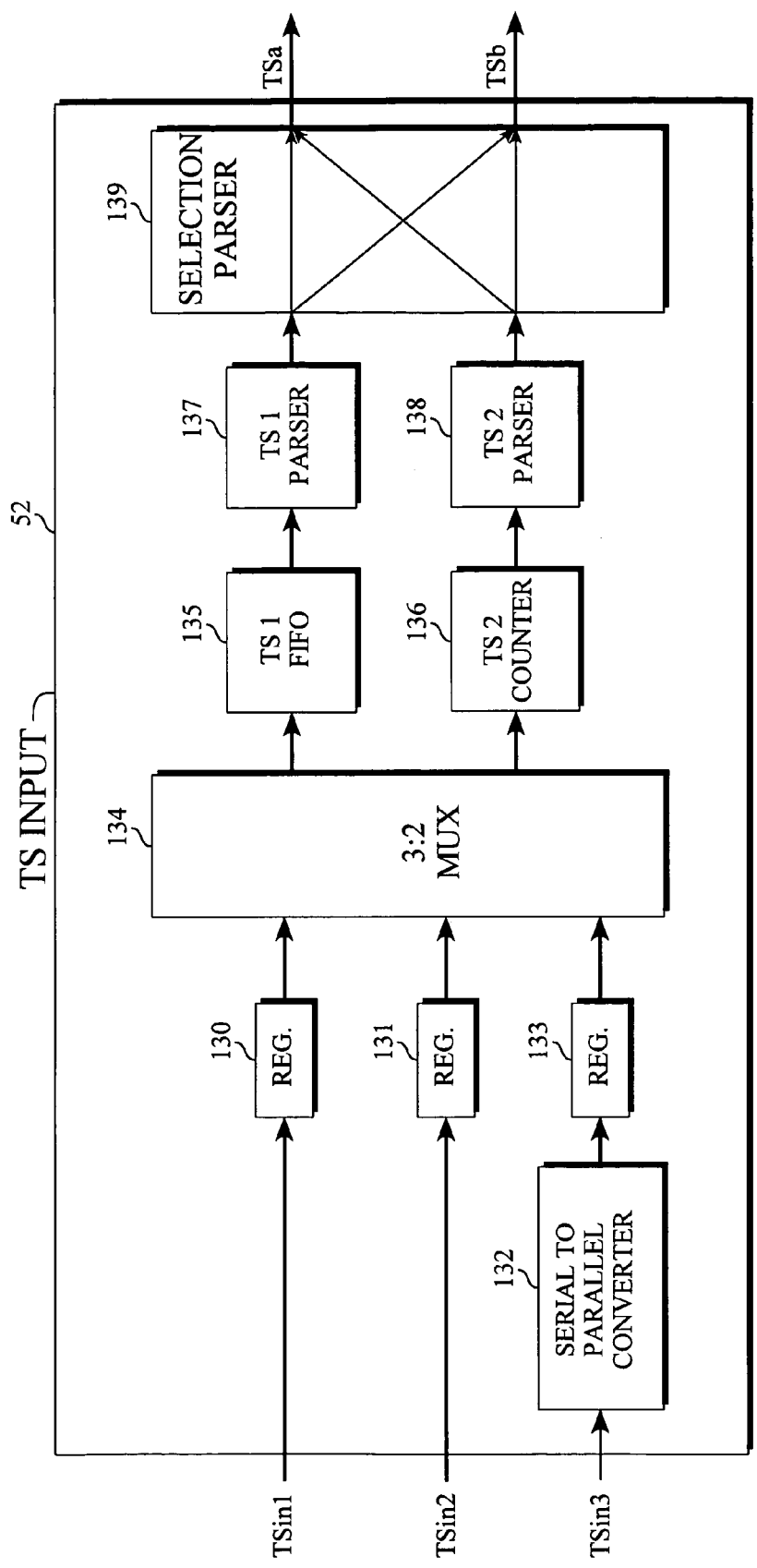
FIG. 9 shows representative form of construction for the transport stream (TS) input unit of FIG. 5.

Referring now to FIG. 9 there is shown in greater detail a representative form of construction for the transport stream input unit 52 of FIG. 5. The TSin1 and TSin2 signals are supplied to input registers 130 and 131. The serial input signal TSin3 is supplied to a serial-to-parallel converter 132 which converts same from serial form to parallel form. The parallel output of converter 132 is supplied to a further input register 133. The outputs of registers 130, 131, and 133 are connected to a three-to-two multiplexer 134. This multiplexer 134 selects two out of the three inputs and supplies one of the selected inputs to a TS1 FIFO unit 135 and the other of the selected inputs to a TS2 counter unit 136. FIFO 135 provides the input for a TS1 parser 137, while the counter 136 provides the input for a TS2 parser 138. Parsers 137 and 138 analyze their respective signal streams on a byte-by-byte basis and assign a plural-bit tag to each data byte. More particularly, each of parsers 137 and 138 includes a qualifying mechanism for receiving and qualifying incoming data bytes according to their positions and values in their plural-byte data packets. In a representative embodiment, a 5-bit tag is generated for and attached to each data byte. The value of this 5-bit tag is determined by the qualifying process performed by the qualifying mechanism. Parsers 137 and 138 are, in turn, connected to a selection parser 139 which determines the particular output path, TSa or TSb, to which each data stream is connected.

Figure 10:
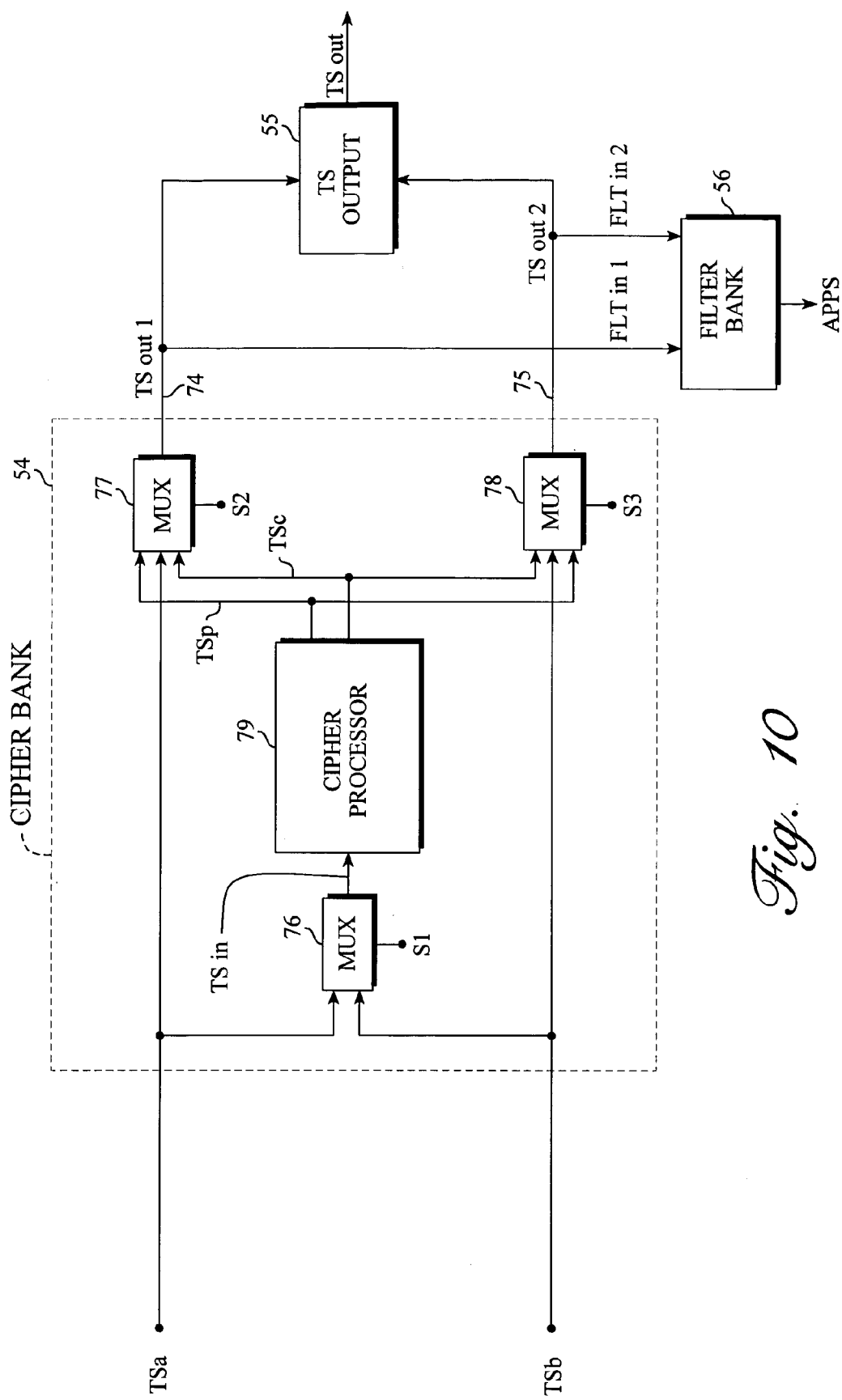
FIG. 10 shows in more detail a representative form of construction for the cipher bank unit of FIG. 5.

Referring to FIG. 10, there is shown in more detail a representative form of construction for the cipher bank 54 of FIG. 5. Cipher bank 54 receives the two signal streams TSa and TSb from the TS input unit 52 of FIG. 9. The two output buses 74 and 75 from cipher bank 54 are connected to the TS output unit 55 and the filter bank 56. Thus, the cipher bank 54 has two input streams and two output streams. By selection via multiplexers 76, 77, and 78, one of the input streams is processed by a cipher processor 79, while the other input stream is simply bypassed to the output of its corresponding one of multiplexers 77 and 78. Multiplexers 76, 77 and 78 are controlled by selection signals S1, S2 and S3, respectively, obtained by way of the VPB bus.

For a first set of multiplexer settings, the TSa data stream is transferred by way of multiplexer 76 to the cipher processor 79 and the output of cipher processor 79 is transferred by way of multiplexer 77 to the TSout1 bus 74 of the cipher bank 54. For this same case, the second input data stream TSb, is supplied by way of multiplexer 78 to the TSout2 bus 75. For the second set of multiplexer settings, the situation is reversed. The TSb data stream is supplied by way of multiplexer 76 to the cipher processor 79 and the resulting processed signal is supplied by way of multiplexer 78 to the TSout2 bus 75. In this second case, the TSa input data stream is supplied by way of multiplexer 77 to the TSout1 bus 74. Cipher processor 79 outputs both a protected data stream TSp and a clear data stream TSc. Multiplexers 77 and 78 select one or the other, but not both of these data streams.

Figure 11:
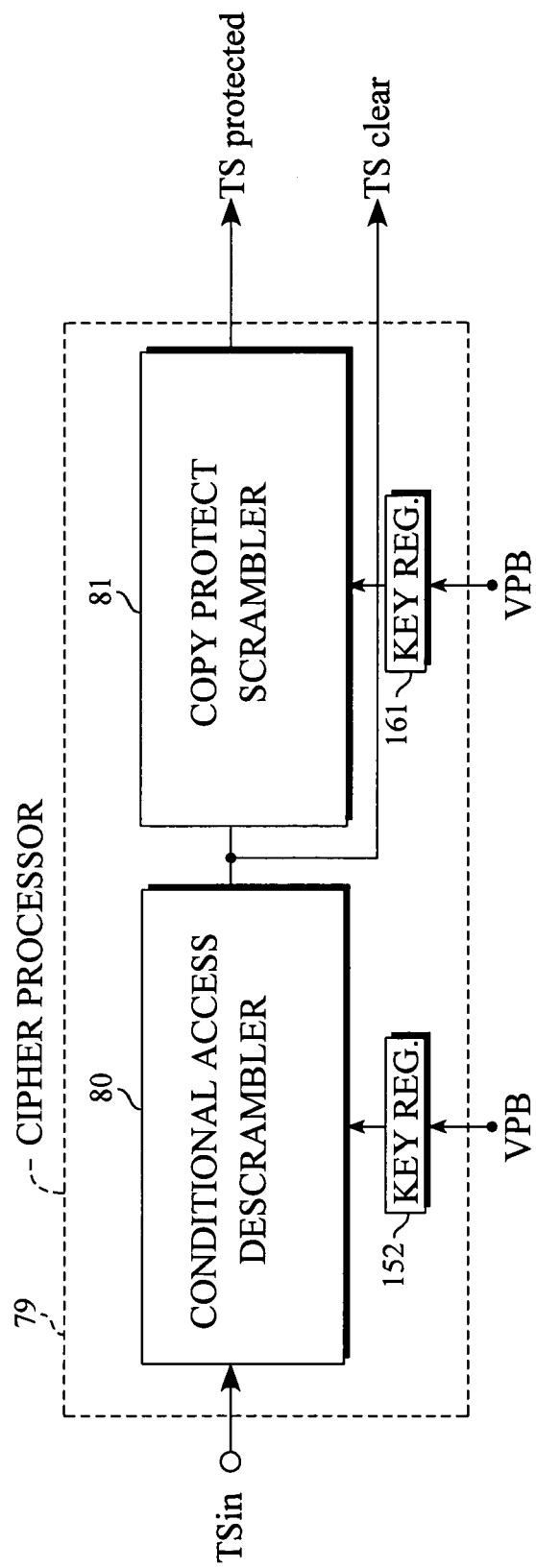
FIG. 11 shows a general form of construction for the cipher processor of FIG. 10.

Referring to FIG. 11, there is shown the primary elements of the cipher processor 79 of FIG. 10. As seen in FIG. 11, cipher processor 79 includes a conditional access descrambler 80 and a copy protection scrambler 81. Descrambler 80 removes the network scrambling protection layer. Descrambler 80 is capable of descrambling the following encryption formats: the DVB super scrambling format used in Europe, the DES and 3DES data encryption standard formats which are used in the United States, and the MULTI2 format which is used in Japan. The copy protect scrambler 81 adds a content scrambling protection layer to the clear copy signal at the output of descrambler 80 to preclude the data content from being stolen at the output of the conditional access module 17 this being particularly significant when it is copyrighted material. Scrambler 81 uses the DES data encryption standard scrambling method.

Cipher processor 79 is an adaptive trans-scrambler for converting one encryption format to a different encryption format. This enables the conditional access module 17 to accommodate a relatively large number of different incoming encryption formats.

Figure 12:
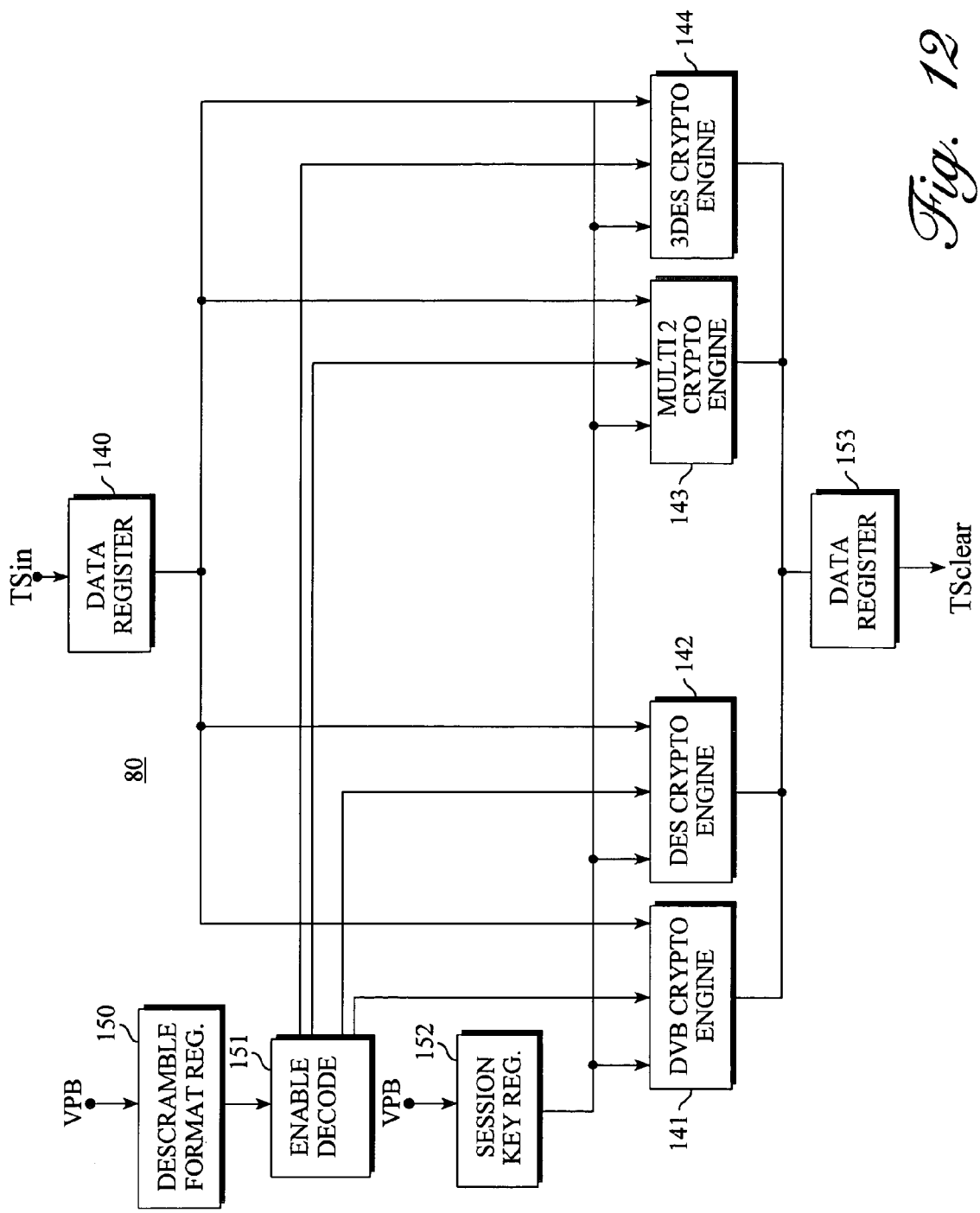
FIG. 12 shows the details of a representative form of construction for the conditional access descrambler of FIG. 11.

FIG. 12 shows the details of a representative form of construction for the conditional access descrambler 80 of FIG. 11. The descrambler 80 of FIG. 12 includes an input data register 140 for receiving the TSin data stream from the multiplexer 76 of FIG. 10. Descrambler 80 also includes a set of four cryptographic engines 141–144 that share the same control logic and key registers for descrambling any one of the following encryption formats: DVB, DES, MULTI2 and 3DES. The DES and 3DES cryptographic engines 142 and 144 include programmable feedback registers to support most of the DES modes of operation as defined by the Federal Information Processing Standards Publication (FIPS) PUB81 namely, the DES-ECB, DES-CBC, DES-OFB, 3DES-ECB, 3DES-CBC and 3DES-OFB modes. Other encryption formats can be accommodated by providing appropriate additional cryptographic engines. The foregoing acronyms have the following meanings:

| ACRONYM | DESCRIPTION |
|---------|-------------|
| DVB | Digital Video Broadcasting (Europe) |
| DES | Data Encryption Standard (U.S.) |
| ECB | Electronic Code Book |
| CBC | Cipher Block Chaining |
| OFB | Output Feedback |

A descramble format register 150 and an associated decoder 151 determine which one of the primary cryptographic engines 141–144 is activated to process the incoming data stream. Descramble format register 150 is loaded by way of the VPB bus with a plural-bit control signal which designates the cryptographic engine to be used. This control signal combined with an analysis of the position of the data byte within its transport packet defines which feedback mode of operation is applied for a given data byte. Thus, only a selected one of the cryptographic engines 141–145 is activated for any given transport stream and one feedback mode of operation is used for any given data byte within the transport stream.

The active session key pairs in session key register 152 are uniquely renewed whatever the active cryptographic engine and the feedback mode of operation. When 3DES engine 144 is the active cryptographic engine, three times less key pairs are stored in session key register 152. The data register 140 selects which key pair is valid for a given data byte, depending on to which transport packet it belongs. Then descrambling key pairs are loaded into session key register 152 by way of The VPB bus. Register 152, in turn, supplies the descrambling key pair to the active one of cryptographic engine 141–144. The descrambled data stream appearing at the output of the selected one of cryptographic engines 141–144 is supplied to an output data register 153 to provide a clear or unscrambled output signal TSclear or TSc.

Figure 13:
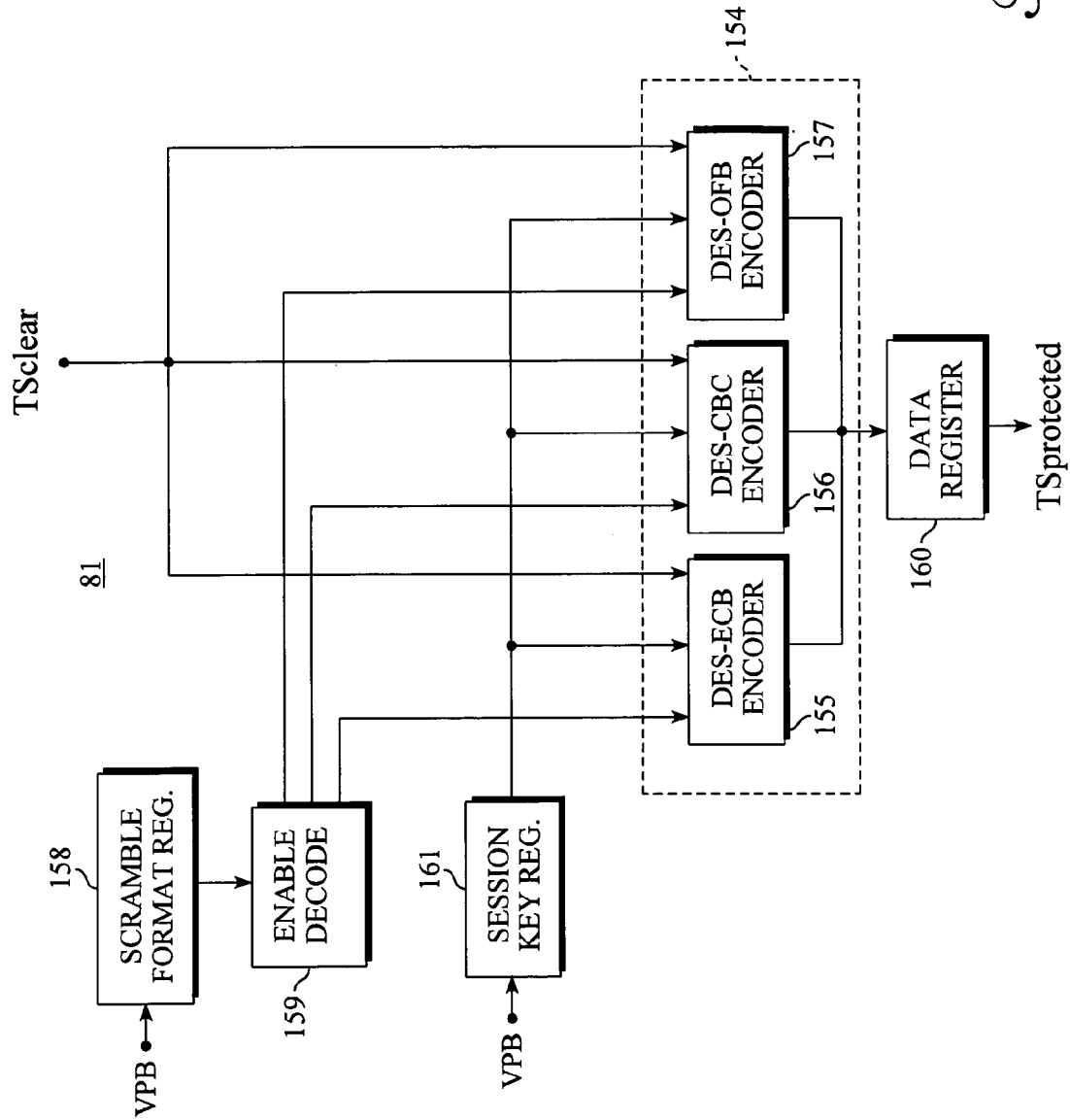
FIG. 13 shows the details of a representative form of construction for the copy protect scrambler of FIG. 11.

Referring now to FIG. 13, there is shown the details of a representative form of construction for the copy protect scrambler 81 of FIG. 11. For the embodiment shown in FIG. 13, The descrambler 81 includes a DES encryption engine 154 and supports most of the DES modes of operation as defined by the Federal Information Processing Standards Publication PUB 81 these modes are represented by DES-ECB, DES-CBC and DES-OFB encoders 155–157. Selection of a desired mode of operation is accomplished by means of a plural-bit control signal which is loaded into a scramble format register 158. This control signal controls an enable decoder 159 to activate a select one of its output lines, which output lines individually run to different ones of the encoders 155–157. The scrambled data stream appearing at the output of the selected encoder is supplied to an output data register 160 to provide the copy protected output signal TSprotected or TSp. The actual scrambling process which is followed in the selected encoder is controlled by a plural-bit scrambling session key which is loaded into a session key register 161. This scrambling session key is obtained from the microprocessor unit 42 by way of The VPB bus.

Figure 14:
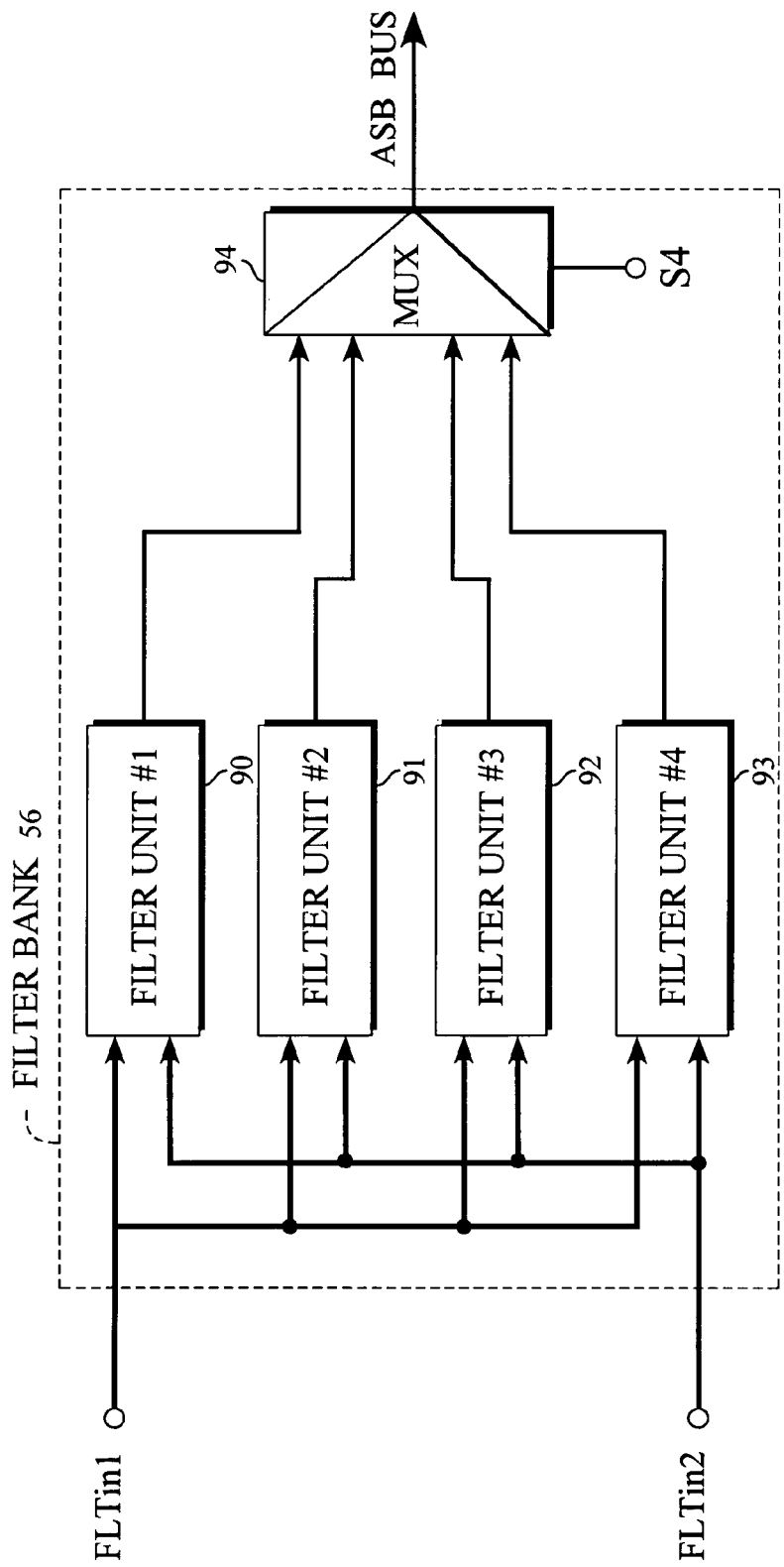
FIG. 14 shows a representative form of construction for the filter bank unit of FIG. 5.

Referring now to FIG. 14, there is shown a representative form of construction for the filter bank 56 of FIG. 5. This filter bank 56 examines incoming data streams to determine the type of data packets being received. When a desired packet is identified, its data payload is then stored in the proper location in memory 43 which is assigned to its particular packet type. In this way, the incoming data may be filtered or sorted according to the application or use for which it is intended. Filter bank 56 has two inputs FLTin1 and FLTin2 which are received from cipher bank 54. These inputs may convey different transport stream formats.

The filter bank 56 includes four filter units 90–93 which can be independently set up to process different data streams. This architecture allows a flexible adjustment of the filtering resources depending on the type of application. For example, if the conditional access module is set up to support ATSC-type advanced television services (for example, high-definition television), the four filter units 90–93 are tuned to the in-band channel. For an open cable type of operation, on the other hand, up to three of the filter units can be set to process the out-of-band channel for collecting IP and proprietary messages, while the fourth filter unit must stay tuned to the in-band channel for processing in-band command signals. The outputs of filter units 90–93 are selectively connected to the microprocessor ASB bus by a multiplexer 94 which is controlled by switching signal S4.

Figure 15:
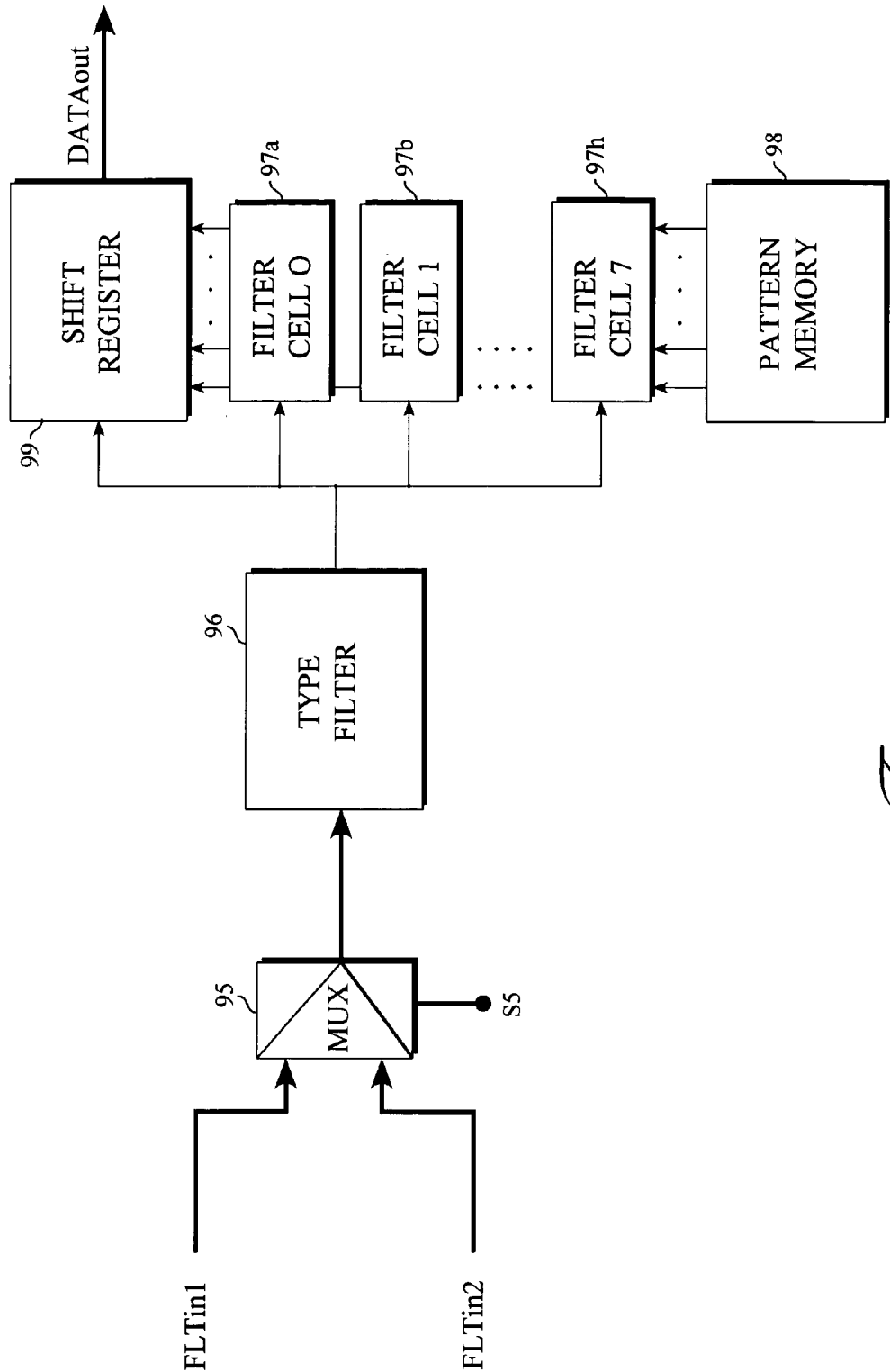
FIG. 15 shows in greater detail the construction of one of the filter units of FIG. 14.

FIG. 15 shows in greater detail a representative form of construction for one of the filter units 90–93 of FIG. 11. Each of the filter units 90–93 is of this same construction. The filter unit of FIG. 15 is tuned to one of the two inputs FLTin1 and FLTin2 by a multiplexer 95 which is set to select one of the two inputs by a selector signal S5. The selected input data stream is supplied to a Type Filter 96 which prefilters the data bytes according to the plural-bit tags attached to them in the TS input unit 52 of FIG. 9. The pre-filtered bytes are then sent to an array of filter cells 97a–97h for further value comparison. Pre-recorded signal patterns which it is desired to detect are stored in a pattern memory 98 and are supplied to filter cells 97a–97h. When a pattern match occurs, the corresponding filter cell loads a shift register 99. Complete messages are extracted from shift register 99 for storage in the memory unit 43 associated with the CAM microprocessor unit 42.

Figure 16B:
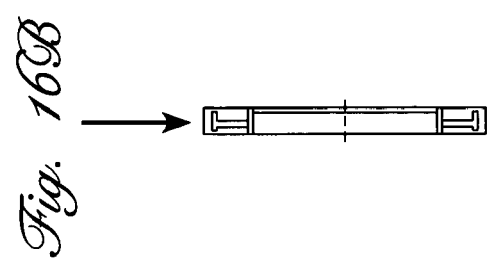
FIG. 16B is a right end view of the FIG. 16 card reader.
Figure 16:
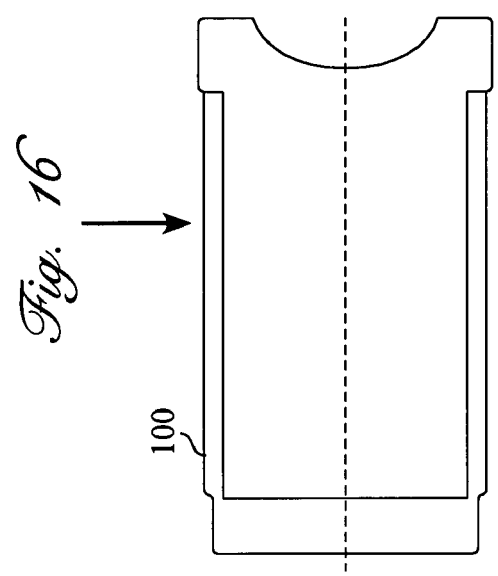
FIG. 16 is a plan view of one form of PCMCIA Smart Card reader that may be used with the present invention.
Figure 16C:
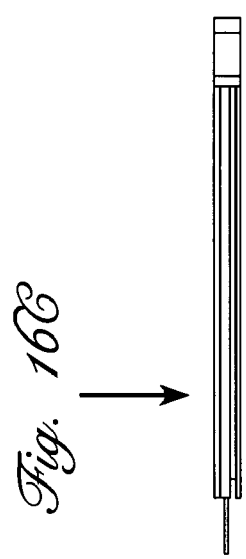
FIG. 16C is a side view showing one side of the card reader of FIG. 16.
Figure 16A:
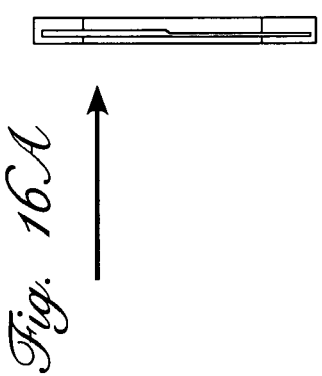
FIG. 16A is a left end view of the FIG. 16 card reader.

FIG. 16 is a plan view of one form of PCMCIA smart card reader that may be used with the present invention. FIG. 16A is a left-end view, FIG. 16B is a right-end view and FIG. 16C is a side view of the card reader shown in FIG. 16. The acronym PCMCIA stands for Personal Computer Memory Card International Association. This is a non-profit trade association formed in 1989 to define a standard memory card interface. The smart card reader of FIG. 16 includes a metallic casing 100 which is adapted to receive a plastic memory card or smart card of approximately the size of a plastic credit card. The casing 100 conforms to ISO Standard 7816. In use, the smart card is inserted into the casing 100 and the casing 100 is, in turn, inserted into an appropriate connector receptacle in the set-top-box 16.

Figure 17:
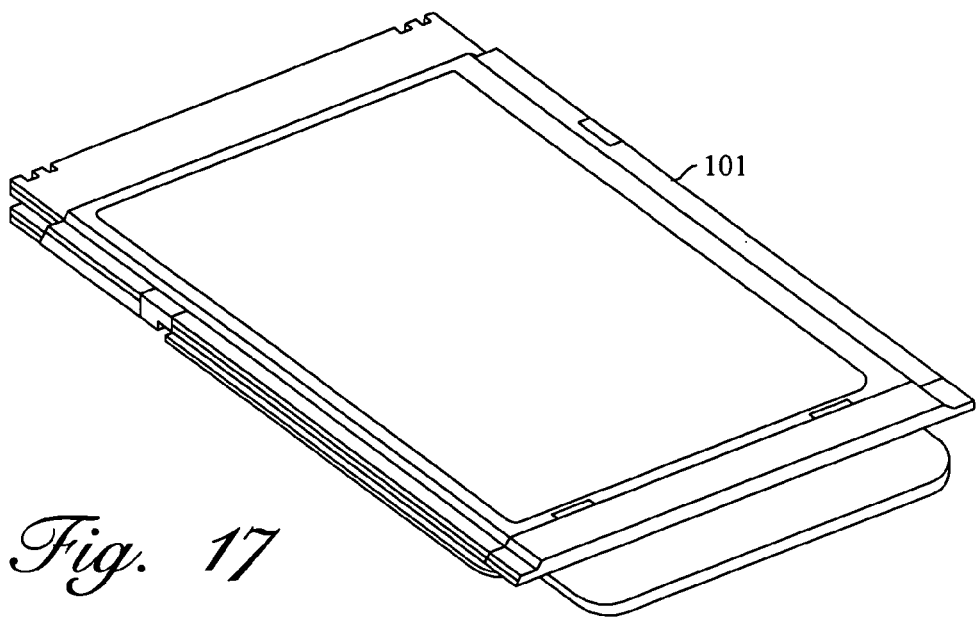
FIG. 17 is a perspective view of another form of PCMCIA card reader that may be used with the present invention.
Figure 18:
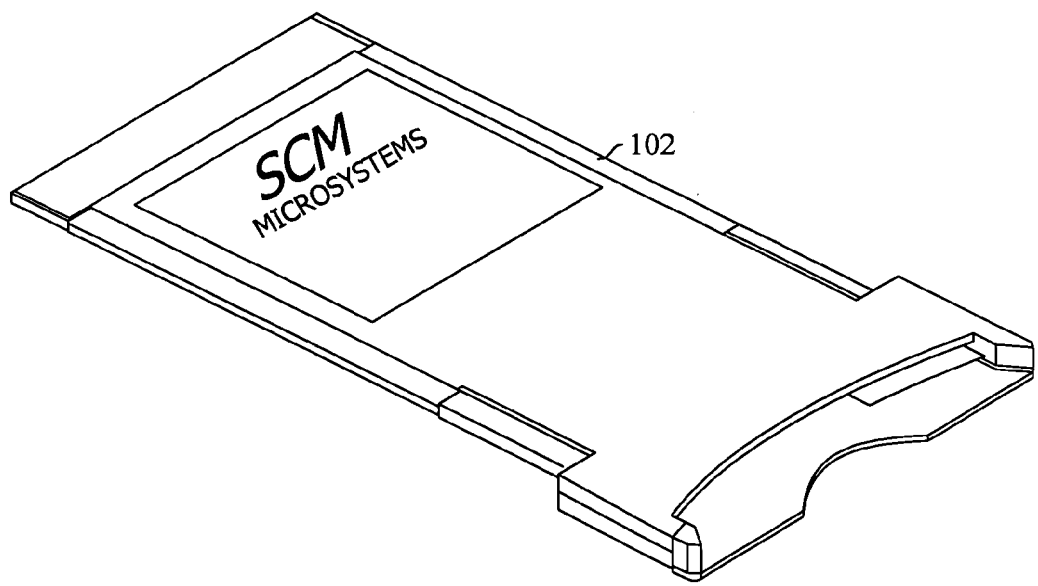
FIG. 18 shows a further form of card reader that may be used.

FIG. 17 is a perspective view of another form of PCMCIA card reader that may be used with the present invention. The reader casing 101 of FIG. 17 has a shorter extension, hence, a shorter overall length. FIG. 18 shows a further form of card reader that may be used. The reader casing 102 of FIG. 18 is a so-called dual reader casing and is adapted to receive two different smart cards.

FIGS. 19, 20 and 21 show the packet formats for different types of data transport streams that may be handled by the present invention. FIG. 19 shows the format for an MPEG data stream packet. FIG. 20 shows the format for a DSS data stream packet and FIG. 21 shows the format for an ATM data stream cell. The MPEG format is the data transmission format developed by the Motion Picture Expert Group. The preferred form of MPEG is MPEG-2 which is defined in ISO/IEC Standard 13818. The acronym "DSS" stands for Digital Satellite Systems and refers to a format developed for use in transmitting digital signals by some satellite operators. The acronym "ATM" stands for Asynchronous Transfer Mode. It is a digital signal protocol for efficient transport of both constant rate and burst type information in broadband digital networks. The ATM digital stream consists of fixed-length packets called "cells". Each cell contains 53 8-bit bytes and is comprised of a 5-byte header and a 48-byte information payload. The digital television signal standard approved for use in the United States employs The MPEG-2 transport stream format for packeting and multiplexing the video, audio and data signals.

An MPEG packet has an overall length of 188 bytes and includes a 4-byte header field and a variable length adaptation field which can vary in length from zero bytes to several bytes. The remainder of the packet is comprised of payload bytes. A DSS packet has an overall length of 130 bytes and includes a 3-byte header field and an optional variable length adaptation field of relatively-small length. The remainder of the DSS packet is comprised of payload bytes.

Figure 22:
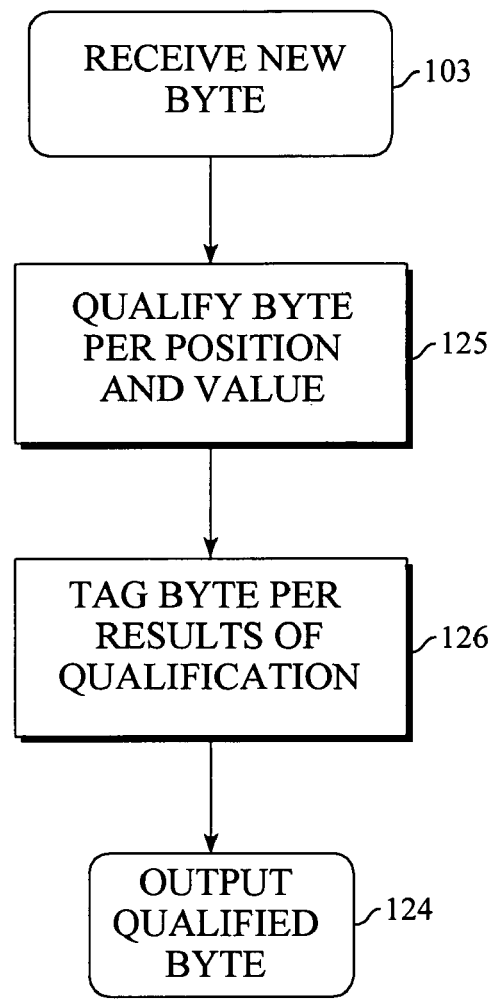
FIG. 22 is a flow chart used in explaining a multiple data transport feature of the present invention.

FIG. 22 is a flow chart which explains the general nature of the multiple data transport feature of the present invention. Each newly received data byte (block 103) is examined and qualified according to its position and value in its data packet (block 125). The examined byte is then tagged with a plural-bit tag (block 126), the value of the tag being determined by the results of the qualifying process (block 125). The resulting tagged byte is then passed on as a qualified byte (block 124). In the present embodiment, the process described by FIG. 22 is performed by the TS input unit 52 shown in FIG. 9. The qualification and tagging of The received data bytes is performed by The parsers 137 and 138.

Figure 23:
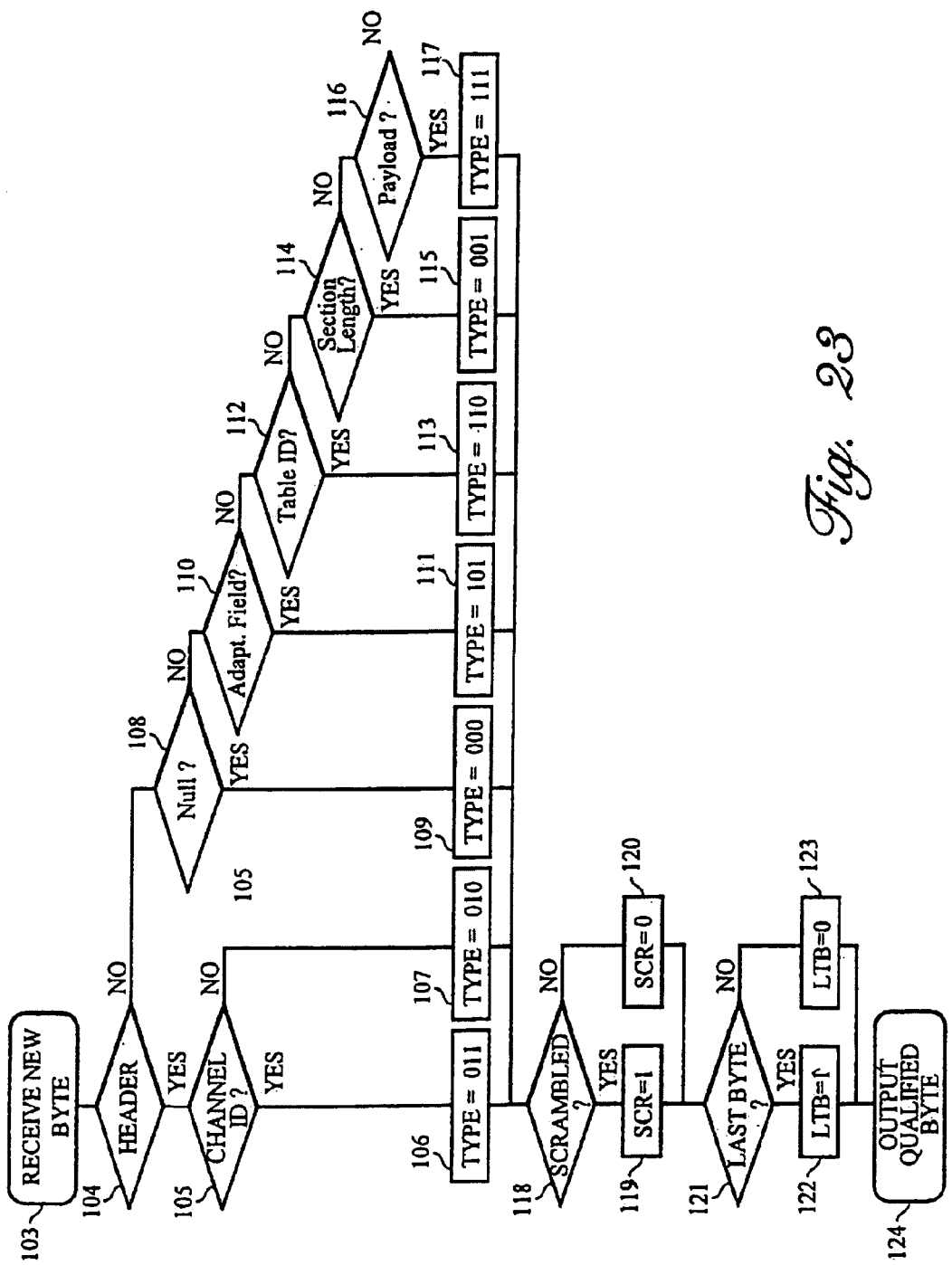
FIG. 23 is a detailed flow chart for a representative implementation of the method of FIG. 22.

Referring to FIG. 23, there is shown a detailed flow chart for a representative implementation of The method of FIG. 22. This multiple transport method of FIG. 23 enables The conditional access module 17 to handle any of The MPEG, ATM and DSS transport stream formats. Each incoming data byte is qualified according to its position and value within its packet. This qualification mechanism attaches a 5-bit tag to each data byte, which tag contains all The information required for further processing of The byte. The qualification of each new byte starts with block 103 of FIG. 23, which block represents The reception of The new byte. The byte is first examined to determine if it is a header byte (block 104). If it is, a determination is then made as to whether it contains channel identification (ID) data (block 105). If The answer is yes, The byte is assigned a 3-bit tag portion having a value of "011" (block 106). If it is not a channel ID, then The byte is assigned a 3-bit tag portion having a value of "010" (block 107). Note that The total tag is a 5-bit tag. The purpose of The other two bits will be described shortly.

If The determination of block 104 determines that The new byte is not a header byte, then The byte undergoes a series of further non-header byte tests. The first test, represented by block 108, is to determine whether The byte is a null byte. If yes, it is assigned a 3-bit tag having a code of "000", as indicated by block 109. If The answer is no, then The byte proceeds to an adaptation field test represented by block 110. If The byte is an adaptation field byte, then it is assigned a tag value of "101", as represented by block 111. If it is not an adaptation field byte, then The test of block 112 is performed to determine whether or not it is a table identification (ID) byte. If yes, The byte is assigned a 3-bit tag having a value of "110", as represented by block 113. If no, The byte is examined per block 114 to determined whether it is a section length indicator byte. If yes, it is assigned a 3-bit tag value of "001", as indicated at block 115.

If no, The byte proceeds to The payload decision block 116. Since this is The only alternative left, The byte is determined to be a payload byte and is given a 3-bit tag portion having a value of "111", as indicated at block 117.

After assignment of The initial 3-bit portion of its tag, The newly received byte is tested as indicated by decision block 118, to determine whether its data is scrambled or clear. If scrambled, a fourth bit in The tag, namely, The SCR bit is set to 1. If not scrambled, The SCR bit is set to 0. The byte is then tested as indicated by block 121 to determine whether it is The last byte of either a header field or a payload field. If it is a last byte, The LTB bit (The fifth bit in The 5-bit tag) is set to 1 (block 122) and if not, The LTB bit is set to 0 (block 123). This completes The qualification process and The qualified output byte at step 124 is now in condition for further processing in The conditional access module 17.

The qualification process of FIG. 23 produces a stream of output bytes which are no longer dependent on The particular transport stream format which brought them to The conditional access module 17. Thus, The conditional access module 17 is enabled to process a variety of different transport stream formats in an efficient manner with minimal complication. And while the described implementation supports The MPEG, DSS and ATM transport stream formats, it can be readily extended to handle other packet-type or cell-type transport structures.

While there have been described what are at present considered to be preferred embodiments of this invention, it will be obvious to those skilled in the art that various changes and modifications may be made therein without departing from the invention and it is, therefore, intended to cover all such changes and modifications coming within the true spirit and scope of the invention.

What is claimed is:

1. A multiple transport method for enabling a conditional access module to handle any of a plurality of transport stream formats, the multiple transport method comprising:
   qualifying received data bytes according to their positions and values within a data packet; and
   attaching a multi-bit tag to each received data byte, the tag containing information required for further processing of the byte.

2. The multiple transport method according to claim 1, further comprising examining each of said bytes to determine if said byte is a header byte.

3. The multiple transport method according to claim 2, further comprising determining whether said byte contains channel identification data.

4. The multiple transport method according to claim 3, further comprising performing an adaptation field test.

5. The multiple transport method according to claim 4, further comprising determining whether said byte is a payload byte.

6. The multiple transport method according to claim 5, further comprising determining whether said data in said byte is scrambled or clear.

7. The multiple transport method according to claim 1, further comprising producing a stream of output bytes which are no longer dependent on the particular transport stream format in which the stream arrived at said conditional access module.

8. A multiple transport system for enabling a conditional access module to handle any of a plurality of transport stream formats, the multiple transport system comprising:
   a qualification mechanism for processing received data bytes according to their positions and values within a data packet; and a tagging mechanism for applying a multi-bit tag to each received data byte, the tag containing information required for further processing of the byte.

9. The multiple transport method according to claim 8, further comprising a mechanism for examining each of said bytes to determine if said byte is a header byte.

10. The multiple transport system according to claim 9, further comprising a mechanism for determining whether said byte contains channel identification data.

11. The multiple transport system according to claim 10, further comprising a mechanism performing an adaptation field test.

12. The multiple transport system according to claim 11, further comprising a mechanism for determining whether said byte is a payload byte.

13. The multiple transport system according to claim 12, further comprising a mechanism for determining whether said data in said byte is scrambled or clear.

14. The multiple transport system according to claim 8, further comprising a mechanism producing a stream of output bytes which are not dependent on the particular transport stream format in which the stream arrived at said conditional access module.

15. The multiple transport system according to claim 8, configured to receive input transport streams formatted according to at least one of MPEG, DSS and ATM transport stream formats.

16. The multiple transport system according to claim 8 configured to receive packet-type and cell-type transport structures.

17. A multiple data transport mechanism capable of receiving a plurality of different transport stream formats, the mechanism comprising:
   a qualifying mechanism for receiving and qualifying incoming data bytes according to their positions and values in their plural-byte data packets; and
   a tagging mechanism for assigning a plural-bit tag to each data byte, the tag having a value determined by the results of a qualifying process performed by the qualifying mechanism.

18. A method for handling any of a plurality of transport stream formats, the method comprising:
   qualifying each received data byte according to its position and value; and
   attaching a tag to each received data byte.

19. A digital signal receiving system comprising:
   an input signal channel for receiving a digital signal stream which carries digital television signals, wherein the data stream is transmitted in one of a plurality of different digital signal formats;
   transmission format converter circuitry for converting the incoming data stream into a transmission format independent set of digital television signals, the converter circuitry further comprising a qualifying mechanism for receiving and qualifying each incoming data byte according to its position and value in its plural-byte data packet and further comprising a tagging mechanism for assigning a plural-bit tag to each data byte, the tag having a value determined by the results of a data byte qualifying process performed by the qualifying mechanism; and
   a digital display mechanism for converting the transmission format independent digital television signals into a visual image, wherein the digital signal receiving channel further comprisies signal processing circuitry, responsive to the tagged data bytes, for supplying television signals to the television display mechanism.

20. A digital signal receiving system in accordance with claim 19, wherein said qualifying mechanism comprises a parser mechanism for analyzing said data bytes and determining their relationships to other data bytes in a plural-bit data packet.

21. A digital signal receiving system comprising:
   at least two input signal channels for receiving at least first and second digital signal streams, where the first stream carries digital television signals and the second stream carries digital message signals, wherein each data stream is transmitted in one of a plurality of different transmission formats;
   transmission format converter circuitry for converting each incoming data stream into a common transmission format independent set of signals;
   a television display mechanism for converting the transmission format independent television signals into a visual image;
   a message processing mechanism for converting the transmission format independent message signals into user perceivable messages;
   a first qualifying mechanism for receiving and qualifying incoming television signal bytes according to their positions and values in their plural-bit data packets;
   a first tagging mechanism for assigning a plural-bit tag to each received television signal byte, the television tag having a value determined by the results of a qualifying process performed by the first qualifying mechanism;
   first signal processing circuitry, responsive to the tagged television signal bytes, for supplying television signals to the television display mechanism;
   a second qualifying mechanism for receiving and qualifying incoming message signal bytes according to their positions and values in their plural-bit data packets;
   a second tagging mechanism for assigning a plural-bit tag to each received message signal byte, the message tag having a value determined by the results of a qualifying process performed by the second qualifying mechanism; and
   second signal processing circuitry, responsive to the tagged message signal bytes, for supplying message signals to the message processing mechanism.

22. A digital signal receiving system in accordance with claim 21, wherein each of said first and second qualifying mechanisms comprises a parser mechanism for analyzing said received data bytes and determining their relationships to other data bytes in a plural-bit data packet.

23. A digital signal receiving system for receiving a plurality of different digital data transport stream formats, the system comprising:
   a qualifying mechanism for receiving and qualifying incoming data bytes according to their positions and values in their plural-byte data packets;
   a tagging mechanism for assigning a plural-bit tag to each data byte, the tag having a value determined by the results of a qualifying process performed by the qualifying mechanism; and
   a signal processing mechanism, responsive to the tagged data bytes, for producing digital information signals.

24. A multiple data transport mechanism for receiving a plurality of different digital data transport stream formats, the mechanism comprising:
   a qualifying mechanism for receiving and qualifying incoming data bytes according to their positions and values in their plural-byte data packets; and a tagging mechanism for assigning a plural-bit tag to each data byte, the tag having a value determined by the results of a qualifying process performed by the qualifying mechanism.

25. A multiple data transport mechanism in accordance with claim 24, wherein said qualifying mechanism comprises a parser mechanism for analyzing said data bytes and determining their relationships to other data bytes in a multi-byte data packet.

26. A multiple data transport mechanism for receiving a plurality of different digital data transport stream formats, wherein data is conveyed in multi-byte data packets, with each packet having a plural-byte header field and a plural-byte payload field, the mechanism comprising:

a first testing mechanism for examining each incoming data byte and determining whether the data byte is a header byte or a payload byte;

a first tagging mechanism, coupled to the first testing mechanism, for assigning header byte indicative tags to the header field data bytes and assigning payload indicative tags to the payload field data bytes;

a second testing mechanism for examining each incoming data byte and determining whether the data is scrambled;

a second tagging mechanism, coupled to the second qualifying mechanism, for assigning a scramble condition tag bit to each data byte and giving the data tag bit a first binary value if the data is scrambled and a second binary value if the data is not scrambled; and signal transfer circuitry for transferring each data byte and its assigned tag bits to a data processing mechanism for producing usable digital information.

* * * * *